(12) United States Patent
Ochiai et al.

(10) Patent No.: US 10,356,282 B2
(45) Date of Patent: Jul. 16, 2019

(54) IMAGE PROCESSING APPARATUS AND COLOR SEPARATION PROCESSING METHOD BY INTERPOLATION PROCESSING USING A MULTI-DIMENSIONAL LOOKUP TABLE

(71) Applicant: CANON KABUSHIKI KAISHA, Tokyo (JP)

(72) Inventors: Takashi Ochiai, Machida (JP); Hisashi Ishikawa, Urayasu (JP); Akitoshi Yamada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 15/492,654

(22) Filed: Apr. 20, 2017

(65) Prior Publication Data

US 2017/0324885 A1    Nov. 9, 2017

(30) Foreign Application Priority Data

May 6, 2016    (JP) .................. 2016-093162

(51) Int. Cl.
*H04N 1/60*    (2006.01)
*G06K 15/02*    (2006.01)
(Continued)

(52) U.S. Cl.
CPC ....... *H04N 1/6019* (2013.01); *G06K 15/1878* (2013.01); *H04N 1/6008* (2013.01);
(Continued)

(58) Field of Classification Search
CPC .... G06K 15/1878; H04N 1/60; H04N 1/6002; H04N 1/6008; H04N 1/6016;
(Continued)

(56) References Cited

U.S. PATENT DOCUMENTS 5,581,376 A * 12/1996 Harrington .......... H04N 1/6019
358/518
7,427,992 B2 * 9/2008 Fukao .................. H04N 1/6052
345/581
(Continued)

FOREIGN PATENT DOCUMENTS

JP    2000-165689 A    6/2000
JP    2009-177285 A    8/2009
JP    2014-187604 A    10/2014

*Primary Examiner* — Scott A Rogers
(74) *Attorney, Agent, or Firm* — Carter, DeLuca & Farrell LLP

(57) ABSTRACT

In color separation processing by a method that combines a multidimensional LUT and interpolation processing, smooth gradation is implemented by reducing errors accompanying interpolation processing. An image processing apparatus includes a color separation processing unit configured to perform, by interpolation processing using a lookup table having a plurality of dimensions in accordance with signal components of an input image, color separation of an input value that is each pixel value of the input image into an output value corresponding to each of signal components handled by an output device, and each grid point of the lookup table is associated with information representing change characteristics at each portion between adjacent grid points for each dimension of the plurality of dimensions, and in the color separation processing, the interpolation processing is performed based on the information representing the change characteristics.

14 Claims, 21 Drawing Sheets

(51) Int. Cl.
*H04N 1/52* (2006.01)
*G06K 15/10* (2006.01)

(52) U.S. Cl.
CPC ......... *H04N 1/6027* (2013.01); *G06K 15/105* (2013.01); *H04N 1/52* (2013.01); *H04N 2201/0082* (2013.01)

(58) Field of Classification Search
CPC .. H04N 1/6019; H04N 1/6022; H04N 1/6025; H04N 1/6027; H04N 1/6058; H04N 1/6061; H04N 1/6063; H04N 1/6066; H04N 1/6069; H04N 1/6072
See application file for complete search history.

(56) References Cited

U.S. PATENT DOCUMENTS

| | | | | |
|---|---|---|---|---|
| 7,706,604 B2* | 4/2010 | Berns | .................. | H04N 1/6033 358/518 |
| 7,821,671 B2* | 10/2010 | Toura | .................. | H04N 1/6019 358/518 |
| 7,852,511 B2* | 12/2010 | Fan | .................. | H04N 1/6016 358/518 |
| 8,054,318 B2* | 11/2011 | Ok | .................. | G09G 5/02 345/600 |
| 8,314,971 B2* | 11/2012 | Nishiyama | .................. | H04N 1/54 358/2.1 |
| 9,150,012 B2 | 10/2015 | Ochiai et al. | | |
| 9,462,091 B2 | 10/2016 | Hara et al. | | |
| 9,485,388 B2 | 11/2016 | Kodama et al. | | |
| 9,811,768 B2* | 11/2017 | Hirano | .................. | G06K 15/1878 |
| 9,930,219 B2* | 3/2018 | Hirano | .................. | H04N 1/6033 |
| 2014/0355010 A1 | 12/2014 | Hara et al. | | |
| 2014/0376056 A1 | 12/2014 | Fujimoto et al. | | |
| 2015/0015914 A1* | 1/2015 | Kakutani | .................. | G06K 15/1878 358/3.01 |
| 2016/0004942 A1 | 1/2016 | Sumi et al. | | |
| 2017/0041502 A1 | 2/2017 | Fuse et al. | | |
| 2017/0111547 A1 | 4/2017 | Otani et al. | | |
| 2017/0111548 A1 | 4/2017 | Yamamoto et al. | | |
| 2018/0234591 A1* | 8/2018 | Ochiai | .................. | H04N 1/6019 |
| 2018/0295258 A1* | 10/2018 | Ochiai | .................. | H04N 1/6025 |

* cited by examiner

UNIT GRID

TETRAHEDRON

| HIGHER FOUR BITS | POSITION OF UNIT GRID (START POINT TO END POINT) |
|---|---|
| 0000 | 0~16 |
| 0001 | 16~32 |
| 0010 | 32~48 |
| 0011 | 48~64 |
| 0100 | 64~80 |
| 0101 | 80~96 |
| 0110 | 96~112 |
| 0111 | 112~128 |
| 1000 | 128~144 |
| 1001 | 144~160 |
| 1010 | 160~176 |
| 1011 | 176~192 |
| 1100 | 192~208 |
| 1101 | 208~224 |
| 1110 | 224~240 |
| 1111 | 240~255 |

FIG.5

| LOWER FOUR BITS | RELATIVE POSITION ($f_R$, $f_G$, $f_B$) |
|---|---|
| 0000 | 0 |
| 0001 | 1/16 |
| 0010 | 2/16 |
| 0011 | 3/16 |
| 0100 | 4/16 |
| 0101 | 5/16 |
| 0110 | 6/16 |
| 0111 | 7/16 |
| 1000 | 8/16 |
| 1001 | 9/16 |
| 1010 | 10/16 |
| 1011 | 11/16 |
| 1100 | 12/16 |
| 1101 | 13/16 |
| 1110 | 14/16 |
| 1111 | 15/16 |

FIG.7

| INPUT IMAGE DATA | | | KIND OF INK : Bk | | | |
|---|---|---|---|---|---|---|
| R | G | B | INK VALUE | INDEX VALUE | | |
| | | | | $C\_K_R$ | $C\_K_G$ | $C\_K_B$ |
| 0 | 0 | 0 | 252 | 2 | 2 | 3 |
| 0 | 0 | 16 | 236 | 2 | 2 | 2 |
| 0 | 0 | 32 | 221 | 2 | 2 | 2 |
| ... | ... | ... | ... | ... | ... | ... |
| 0 | 0 | 224 | 28 | 2 | 2 | 1 |
| 0 | 0 | 240 | 12 | 2 | 2 | 0 |
| 0 | 0 | 255 | 0 | – | – | – |
| ... | ... | ... | ... | ... | ... | ... |
| 255 | 255 | 240 | 18 | 2 | 2 | 1 |
| 255 | 255 | 255 | 0 | – | – | – |

FIG.8

| INDEX VALUE | CHANGE CHARACTERISTICS EXPRESSION | GRAPH ($f'_x$ FOR $f_x$) |
|---|---|---|
| 0 | $f'_x(0)=1-(1-f_x)^{2.5}$ | 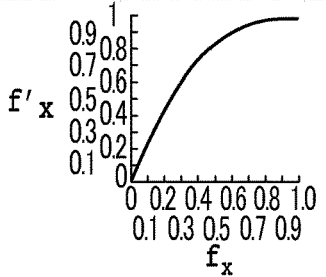 |
| 1 | $f'_x(1)=1-(1-f_x)^{1.4}$ | 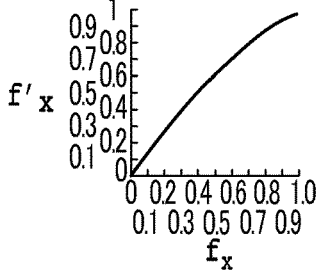 |
| 2 | $f'_x(2)=f_x$ | 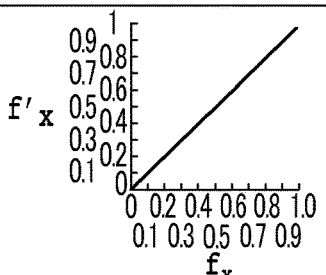 |
| 3 | $f'_x(3)=f_x^{1.4}$ | 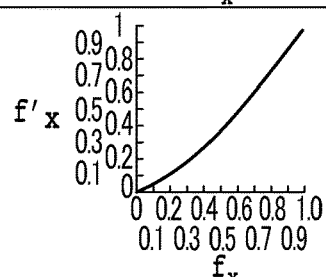 |
| 4 | $f'_x(4)=f_x^{2.5}$ | 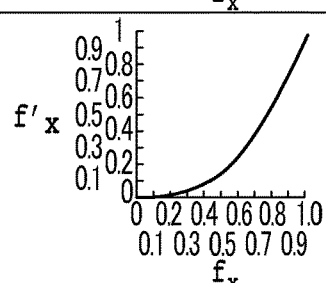 |
FIG.9

| TETRAHEDRON | CONDITION | FOUR GRID POINTS ||||WEIGHT COEFFICIENTS OF FOUR GRID POINTS ||||
| | | $P_1$ | $P_2$ | $P_3$ | $P_4$ | $w_1$ | $w_2$ | $w_3$ | $w_4$ |
|---|---|---|---|---|---|---|---|---|---|
| 401 | $R \geq G \geq B$ | $P_K$ | $P_R$ | $P_Y$ | $P_W$ | $1 - f'R$ | $f'B$ | $f'R - f'G$ | $f'G - f'B$ |
| 402 | $R \geq B \geq G$ | $P_K$ | $P_R$ | $P_M$ | $P_W$ | $1 - f'R$ | $f'G$ | $f'R - f'B$ | $f'B - f'G$ |
| 403 | $B \geq R \geq G$ | $P_K$ | $P_B$ | $P_M$ | $P_W$ | $1 - f'B$ | $f'G$ | $f'B - f'R$ | $f'R - f'G$ |
| 404 | $G \geq R \geq B$ | $P_K$ | $P_G$ | $P_Y$ | $P_W$ | $1 - f'G$ | $f'B$ | $f'G - f'R$ | $f'R - f'B$ |
| 405 | $G \geq B \geq R$ | $P_K$ | $P_G$ | $P_C$ | $P_W$ | $1 - f'G$ | $f'R$ | $f'G - f'B$ | $f'B - f'R$ |
| 406 | $B \geq G \geq R$ | $P_K$ | $P_B$ | $P_C$ | $P_W$ | $1 - f'B$ | $f'R$ | $f'B - f'G$ | $f'G - f'R$ |

FIG.10

HORIZONTAL AXIS:
INPUT SIGNAL VALUE (ONE OF RGB)
VERTICAL AXIS :
INK VALUE

INDEX VALUE : 0 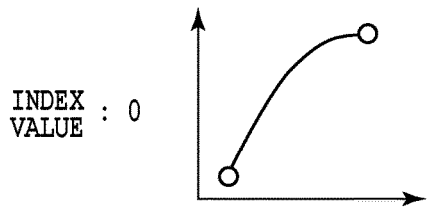

INDEX VALUE : 1 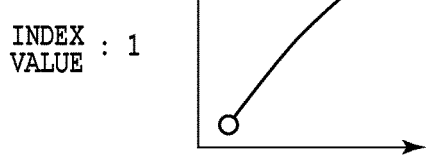

INDEX VALUE : 2 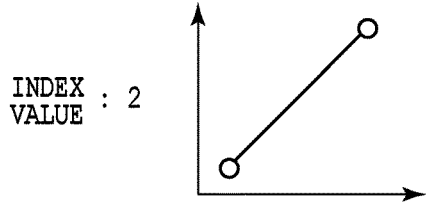

INDEX VALUE : 3 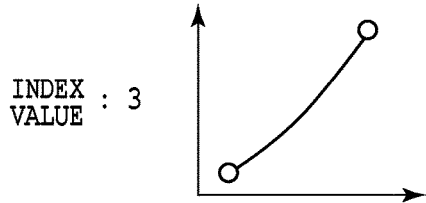

INDEX VALUE : 4 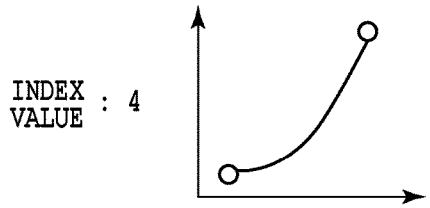

IN CASE WHERE
INK VALUE INCREASES
BETWEEN ADJACENT
GRID POINTS

FIG.11A

HORIZONTAL AXIS:
INPUT SIGNAL VALUE (ONE OF RGB)
VERTICAL AXIS :
INK VALUE

INDEX VALUE : 0 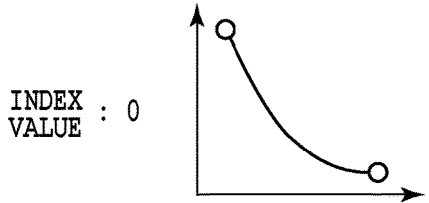

INDEX VALUE : 1 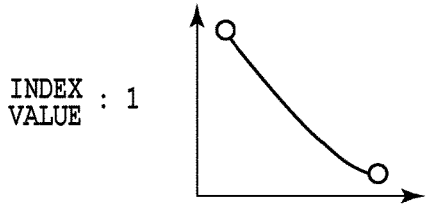

INDEX VALUE : 2 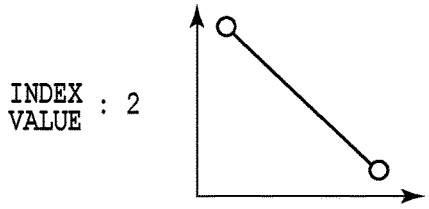

INDEX VALUE : 3 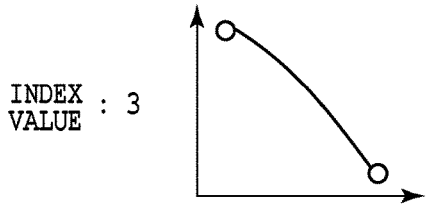

INDEX VALUE : 4 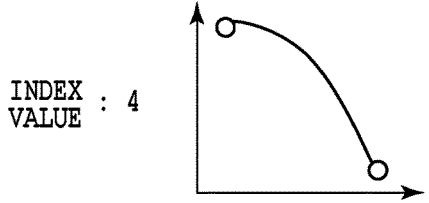

IN CASE WHERE
INK VALUE DECREASES
BETWEEN ADJACENT
GRID POINTS

| INPUT IMAGE DATA | | | | KIND OF INK: K | | | | |
|---|---|---|---|---|---|---|---|---|
| C | M | Y | K | INK VALUE | INDEX VALUE | | | |
| | | | | | C_K$_C$ | C_K$_M$ | C_K$_Y$ | C_K$_K$ |
| 0 | 0 | 0 | 0 | 255 | 2 | 2 | 2 | 3 |
| 0 | 0 | 0 | 16 | 224 | 2 | 2 | 2 | 4 |
| 0 | 0 | 0 | 32 | 203 | 2 | 2 | 2 | 2 |
| ⋮ | ⋮ | ⋮ | ⋮ | ⋮ | ⋮ | ⋮ | ⋮ | ⋮ |
| 0 | 0 | 0 | 224 | 0 | 2 | 2 | 2 | 2 |
| 0 | 0 | 0 | 240 | 0 | 2 | 2 | 2 | 2 |
| 0 | 0 | 0 | 255 | 0 | - | - | - | - |
| ⋮ | ⋮ | ⋮ | ⋮ | ⋮ | ⋮ | ⋮ | ⋮ | ⋮ |
| 255 | 255 | 255 | 240 | 8 | 2 | 2 | 2 | 3 |
| 255 | 255 | 255 | 255 | 0 | - | - | - | - |

FIG.16A

| INPUT IMAGE DATA | | | | KIND OF INK: Cl | | | | |
|---|---|---|---|---|---|---|---|---|
| R | G | B | X | INK VALUE | INDEX VALUE | | | |
| | | | | | C_Cl$_R$ | C_Cl$_G$ | C_Cl$_B$ | C_Cl$_X$ |
| 0 | 0 | 0 | 250 | 230 | 2 | 2 | 3 | 4 |
| 0 | 0 | 16 | 240 | 220 | 2 | 2 | 3 | 3 |
| 0 | 0 | 32 | 235 | 217 | 2 | 2 | 2 | 2 |
| ⋮ | ⋮ | ⋮ | ⋮ | ⋮ | ⋮ | ⋮ | ⋮ | ⋮ |
| 0 | 0 | 224 | 220 | 180 | 2 | 2 | 2 | 2 |
| 0 | 0 | 240 | 210 | 176 | 1 | 2 | 1 | 2 |
| 0 | 0 | 255 | 200 | 172 | - | - | - | - |
| ⋮ | ⋮ | ⋮ | ⋮ | ⋮ | ⋮ | ⋮ | ⋮ | ⋮ |
| 255 | 255 | 240 | 35 | 25 | 2 | 2 | 3 | 2 |
| 255 | 255 | 255 | 30 | 0 | - | - | - | - |

FIG.16B

IMAGE PROCESSING APPARATUS AND COLOR SEPARATION PROCESSING METHOD BY INTERPOLATION PROCESSING USING A MULTI-DIMENSIONAL LOOKUP TABLE

BACKGROUND OF THE INVENTION

Field of the Invention

The present invention relates to image processing to convert input image signals into signals corresponding to a plurality of color components handled by an output device.

Description of the Related Art

A printer represented by an ink jet printer and an electrophotographic printer receives image signals (normally, color signals of RGB) as an input and generates print data by converting the color signals into signals representing amounts of color materials mounted on the printer. This conversion is generally called color separation processing or color conversion processing and there is conversion that combines a multidimensional LUT having the number of dimensions in accordance with the number of signal components of an input image and interpolation processing.

The multidimensional LUT used in the above-described printer normally stores only values (output values corresponding to input values) on grid points obtained by thinning the input color space in order to save the storage capacity of the printer. Then, an output value between adjacent grid points, which cannot be obtained directly from a three-dimensional LUT, is derived by interpolation processing. At this time, there is such a problem that an error occurs in interpolation processing and the color reproduction accuracy between adjacent grid points is reduced.

For this problem, a technique to reduce an error in interpolation processing by switching interpolation processing depending on an input color has been proposed. Japanese Patent Laid-Open No. 2000-165689 has disclosed a method in which nonlinear conversion is performed in the case of an input color on an achromatic gradation guaranteed line and linear conversion is performed in the case of other input colors. Further, Japanese Patent Laid-Open No. 2009-177285 has disclosed a method in which unit grids of interpolation are switched, such as that cubic interpolation is performed for the axes other than the gray axis and tetrahedral interpolation is performed for the gray axis. Furthermore, Japanese Patent Laid-Open No. 2014-187604 has disclosed a method of reducing an error in interpolation processing by performing nonlinear conversion using a one-dimensional LUT before conversion using a three-dimensional LUT. In more detail, this method is a method of increasing linearity of an output signal between adjacent grid points by preparing different one-dimensional LUTs for different colors of RGB and unequalizing the grid point intervals with respect to the axis direction of each one dimension of the color signals of RGB.

However, it is known that the output characteristics within a unit grid differ depending on the position (address) of the unit grid in the color separation processing by the method of a combination of a multidimensional LUT and interpolation processing. For example, in the case where the signal components of an input image are color signals of RGB, in order to perform more accurate interpolation, it is necessary to make the change characteristics of interpolation differ for each of the RGB axes within each unit grid. Regarding this point, for example, in the case of the techniques described in Japanese Patent Laid-Open No. 2000-165689 and Japanese Patent Laid-Open No. 2009-177285, it is possible to change the linearity of interpolation between the achromatic color direction and the directions other than the achromatic color direction and to change the unit grid of interpolation for each color of RGB, but it is not possible to change the interpolation method for the directions of the RGB axes. Further, with the technique described in Japanese Patent Laid-Open No. 2014-187604, it is possible to make the interpolation method (intervals of grid points) differ for the directions of the RGB axes, but it is not possible to make the interpolation method differ for each of the directions of the RGB axes for each unit grid in the three-dimensional LUT. Furthermore, in the case where a specific color area and an axis direction for which it is desired to improve accuracy to the maximum are known, with the techniques described in each of Patent Documents described above, it is necessary to uniformly improve the grid point intervals in all the axis directions of RGB or the accuracy of the interpolation method in accordance with the specific axis direction. Because of this, the burden of calculation and the scale of the circuit increase.

SUMMARY OF THE INVENTION

The image processing apparatus according to the present invention includes a color separation processing unit configured to perform, by interpolation processing using a lookup table having a plurality of dimensions in accordance with signal components of an input image, color separation of an input value that is each pixel value of the input image into an output value corresponding to each of signal components handled by an output device, and each grid point of the lookup table is associated with information representing change characteristics at each portion between adjacent grid points for each dimension of the plurality of dimensions, and the color separation processing unit performs the interpolation processing based on the information representing the change characteristics.

Further features of the present invention will become apparent from the following description of exemplary embodiments with reference to the attached drawings.

BRIEF DESCRIPTION OF THE DRAWINGS

FIG. 5 is an example of a table in which higher four bits of RGB values and the position of the unit grid are associated with each other;

FIG. 7 is an example of a table in which lower four bits of RGB value and a relative position are associated with each other;

FIG. 8 is an example of a table showing a correspondence relationship between RGB values of input image data, an ink value of K, and index values;

FIG. 9 is a diagram showing each of change characteristics expressions associated with each index value as a graph;

FIG. 10 is an example of a table in which four grid points of each of six tetrahedrons and weight coefficients corresponding to the four grid points are put together;

FIG. 11A and FIG. 11B are each a graph representing a change in an interpolated value (ink value);

FIG. 16A is an example of a table showing a correspondence relationship between an ink value of K and index values in the case where input image data is represented by the CMYK color space and FIG. 16B is an example of a table showing a correspondence relationship between an ink value of clear ink and index values in the case where input image data is represented by the RGB color space and further has gloss information;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

In the present embodiment, an example is explained in which an output value between adjacent grid points is obtained by interpolation processing based on information representing change characteristics between adjacent grid points, which are associated with each grid point, on the premise that color separation processing based on interpolation processing using a multidimensional LUT is performed. In each embodiment of the present specification, explanation is given by taking the case where a printout is produced by an ink jet printer as an example, but the printer type is not limited to this. For example, an electrophotographic printer, a dye-sublimation printer, a UV printer that uses a color material that cures by irradiation with ultraviolet rays, or a 3D printer to form a three-dimensional object may be used. Further, it is also possible to apply each embodiment to an image display, such as a display and a projector. Furthermore, it is also possible to apply each embodiment to image processing software, such as photo editing software and CG production software.
(Configuration of Output Device)

Figure 1:
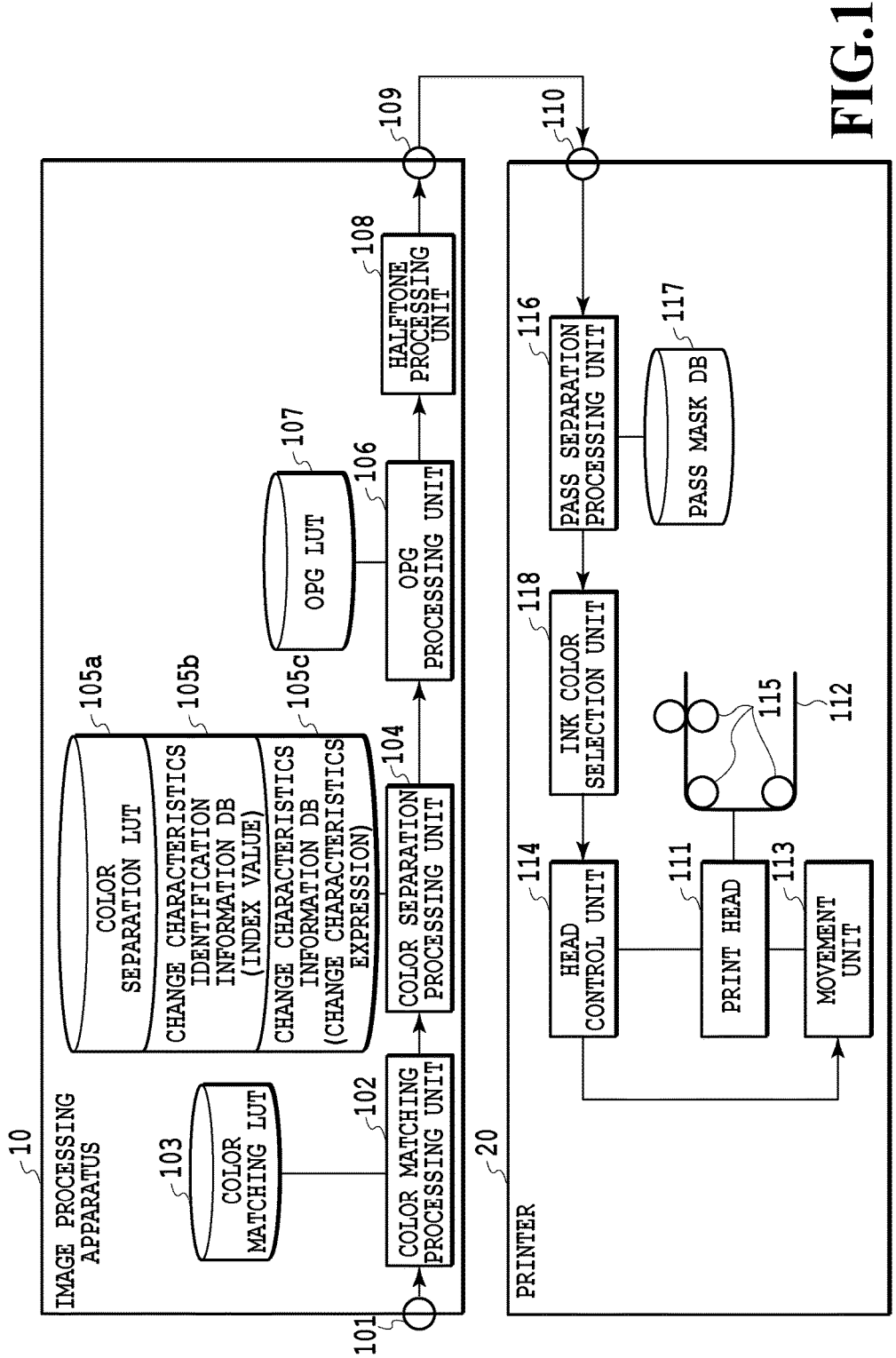
FIG. 1 is a block diagram showing an example of a configuration of a printing system according to a first embodiment.

FIG. 1 is a block diagram showing an example of a configuration of a printing system according to the present embodiment. The printing system includes an image processing apparatus 10 and a printer 20 and both are connected to each other via a printer interface or a circuit. The image processing apparatus 10 is, for example, a common personal computer and image processing functions described below are implemented by an installed printer driver. That is, each unit of the image processing apparatus 10, to be explained below, is implemented by a CPU within the computer executing a predetermined program stored in a memory (ROM or the like) or a hard disk (HDD). A configuration in which the printer 20 includes the image processing apparatus 10 as part of the printer 20 may be accepted.

The image processing apparatus 10 receives an input of image data representing an image to be printed via an input terminal 101. The input image data is sent to a color matching processing unit 102. Here, it is assumed that input image data is RGB image data in which each pixel is represented by an 8-bit (256 tone levels) color signal of R, G, and B, respectively.

The color matching processing unit 102 performs color matching processing for input image data and corrects the color of an RGB image. Due to the matching processing, even in the case where a printer or a printing medium having different color reproduction characteristics is used, it is possible to obtain uniform color reproduction. For color matching processing, a three-dimensional color matching LUT 103 stored in the HDD or the like, not shown schematically, is used. The color matching LUT 103 is an LUT in which output values (RGB values) are described only on 17×17×17 grid points obtained by thinning input values in which each of RGB is represented by 256 tone levels. An output value between adjacent grid points is derived by linear interpolation.

A color separation processing unit 104 generates an 8-bit ink value image of four planes corresponding to colors (here, four colors of CMYK) of color materials included in the printer 20 from the RGB image data corrected by the color matching processing unit 102. At the time of color separation processing, interpolation processing that refers to a color separation LUT 105a, a change characteristics identification information DB 105b, and change characteristics information DB 105c stored in the HDD or the like, not shown schematically, is performed. The color separation LUT 105a is a multidimensional LUT (lookup table) having the number of dimensions corresponding to the signal components of an input mage and used to convert each pixel value of the input image into an output value (here, ink value as a color material value representing the amount of color material) corresponding to the signal component handled by an output device. In the case of the present embodiment, the color separation LUT 105a is a three-dimensional LUT in which ink values are described on grid points thinned into 17×17×17 points and prepared for each kind of ink (here, for each of CMYK). The change characteristics identification information DB 105b is a database storing identification information (in the present embodiment, index values) to specify change characteristics that may be different at each portion between adjacent grid points for each portion between adjacent grid points. Then, the index value is allocated to each portion between adjacent grid points for each of a plurality of dimensions (here, three dimensions of RGB) in accordance with the color component of an input image. In the case of the present embodiment, the index value is associated with each grid point for each dimension of the R-axis, the-G axis, and the-B axis and a numerical value between 0 and 4 to identify change characteristics between adjacent grid points is allocated. However, the grid point whose position coordinate is the maximum value (255) of each axis has no next grid point (portion between adjacent grid points does not exist), and therefore, the index value is not allocated. That is, index values corresponding to 16×16× 16 grid points of the 17×17×17 grid points in all are prepared (see FIG. 8, to be described later). The change characteristics information DB 105c is a database storing information (here, mathematical expressions) representing change characteristics between adjacent grid points. In the present embodiment, five kinds of mathematical expression data representing different change characteristics associated with the above-described index values are stored.

An output gamma (OPG) processing unit 106 performs gamma correction processing for the ink value image generated by the color separation processing unit 104. At the time of gamma correction processing, the OPG processing unit 106 refers to a one-dimensional OPGLUT 107 stored in the HD or the like, not shown schematically. In the OPGLUT 107, values are set in advance for each kind of ink so that lightness of printed matter changes linearly with respect to the pixel value of the ink value image in the case where printing is performed by using only each ink of CMYK. As an evaluation value of lightness, L* specified in CIELAB is used.

A halftone processing unit 108 performs halftone processing (quantization processing) to convert the pixel value of the ink value image of each color obtained by the OPG processing unit 106 into a binary value (or value with a number of tone levels, two or more and less than the number of input tone levels). As the halftone processing, for example, the publicly known dither matrix method or the like is used. The halftone image data obtained by the halftone processing is sent to the printer 20 via an output terminal 109.

The ink jet printer 20 forms an image on a printing medium 112, which is in accordance with halftone image data generated by the image processing apparatus 10, by moving a print head 111 in the vertical and horizontal directions relative to the printing medium 112. The print head 111 has a plurality of print elements (nozzles). In the present embodiment, inks of four colors of cyan (C), magenta (M), yellow (Y), and black (K) are mounted on the print head 111. A movement unit 113 moves the print head 111 under control of a head control unit 114. A conveyance unit 115 conveys the printing medium 112 under control of the head control unit 114. In the present embodiment, it is assumed that a multipass printing method is used, which completes an image by performing a plurality of times of scan with the print head 111 on the printing medium 112. A pass separation processing unit 116 generates scanned data of each ink color based on the halftone image data of each color generated by the image processing apparatus 10 and a pass mask acquired from a pass mask DB 117. An ink color selection unit 118 selects an ink color from the colors of the inks mounted on the print head 111 based on the generated scanned data of each color.

(Outline of Printing Processing)

Figure 2:
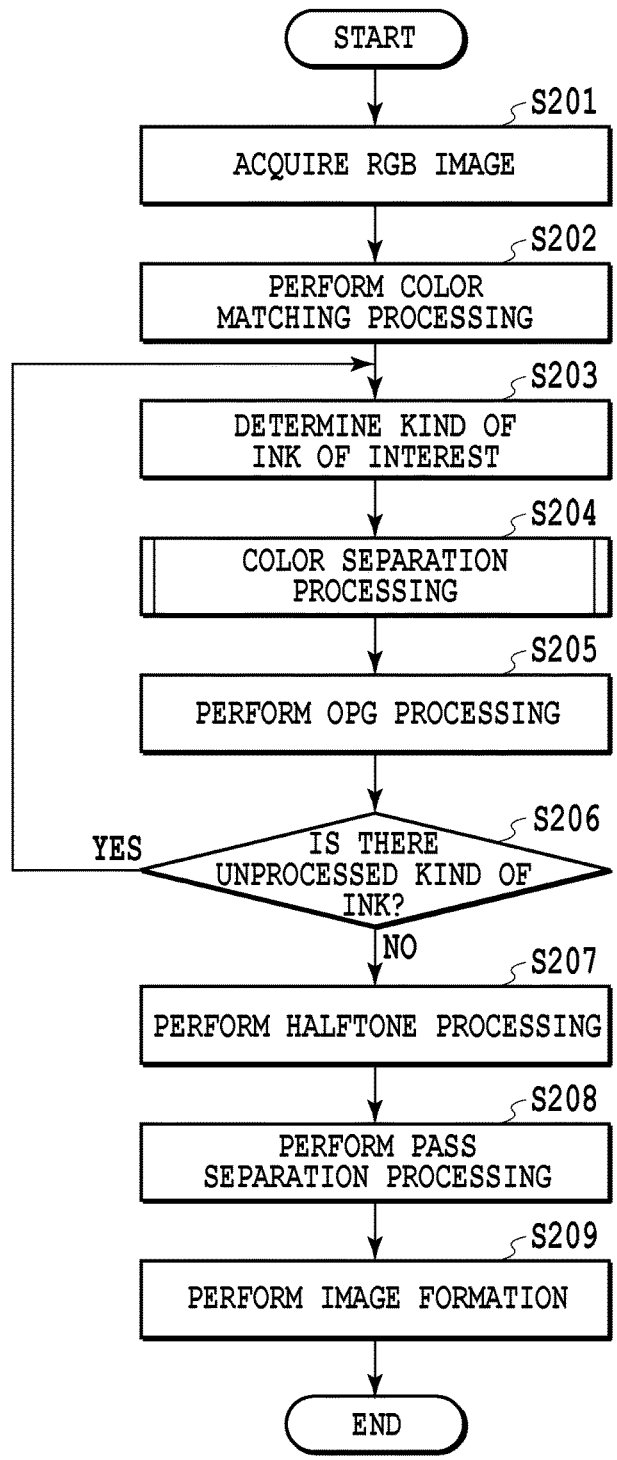
FIG. 2 is a flowchart showing a rough flow of printing processing according to the first embodiment.

Next, an outline of printing processing in the printing system according to the present embodiment is explained. FIG. 2 is a flowchart showing a rough flow of the printing processing in the printing system according to the present embodiment.

First, at step 201, RGB image data is acquired via the input terminal 101. The acquired RGB image data is sent to the color matching processing unit 102. At step 202 that follows, the color matching processing unit 102 refers to the three-dimensional color matching LUT 103 and performs color matching processing.

Next, at step 203, the kind of ink (kind of ink of interest) that is a target of color separation processing is determined from the four colors of CMYK. Then, at step 204, the color separation processing unit 104 performs color separation processing for the RGB image data for which the color matching processing has been performed and generates ink value image data of the kind of ink of interest. In the case where the kind of ink of interest is, for example, cyan, ink value image data corresponding to cyan is generated. In this color separation processing, an ink value between adjacent grid points is obtained by interpolation processing using the above-described color separation LUT corresponding to the kind of ink of interest and a mathematical expression representing the change characteristics between adjacent grid points, which are associated with an index value. In this case, the color separation LUT 105a, the change characteristics identification information DB 105b, and the change characteristics information DB 105c may be saved individually in different storage areas (HDD or memory) or may be saved together. Details of the color separation processing will be described later.

Next, at step 205, the OPG processing unit 106 performs gamma correction processing for the ink value image data obtained by the color separation processing. In this gamma correction processing, the one-dimensional OPGLUT 107 corresponding to the kind of ink of interest is applied. For example, in the case where the kind of ink of interest is cyan, the OPGLUT 107 is used, in which values are set in advance so that the lightness of printed matter changes linearly with respect to the pixel value of the ink value image on a condition that printing is performed by using only a cyan ink.

At step 206, whether the processing up to the OPG processing has been completed for all the kinds of ink of CMYK is determined. In the case where the processing has been completed for all the kinds of ink, the processing advances to step 207. On the other hand, in the case where there is unprocessed kind of ink, the processing returns to step 203 and the next kind of ink is determined to be the kind of ink of interest and each piece of processing at steps 204 to 206 is repeated. In the present embodiment, the order of the kinds of ink of interest is cyan, magenta, yellow, and black, but the order is not limited to this.

At step 207, the halftone processing unit 108 performs halftone processing for the image data of each ink color for which the OPG processing has been performed and converts the image data into halftone image data. This halftone image data is output from the output terminal 109 in an arbitrary size, such as a size corresponding to the entire image and a size corresponding to the band width for each unit printing area, and sent to the printer 20.

At step 208, the halftone image data input via the input terminal 110 is sent to the pass separation processing unit 116 and converted into scanned data for each ink color. Then, at step 209, image formation based on the scanned data is started for each ink color. Specifically, an ink color corresponding to each piece of scanned data is selected by the ink color selection unit 118 and the print head 111 prints an image on the printing medium 112 by driving each nozzle at fixed drive intervals while moving with respect to the printing medium 112 based on the selected ink color. The printing medium 112 is conveyed by a predetermined amount of conveyance for each scan and the entire image is formed.

The above is an outline of the printing processing in the printing system of the present embodiment.

(Color Separation Processing)

Figure 3:
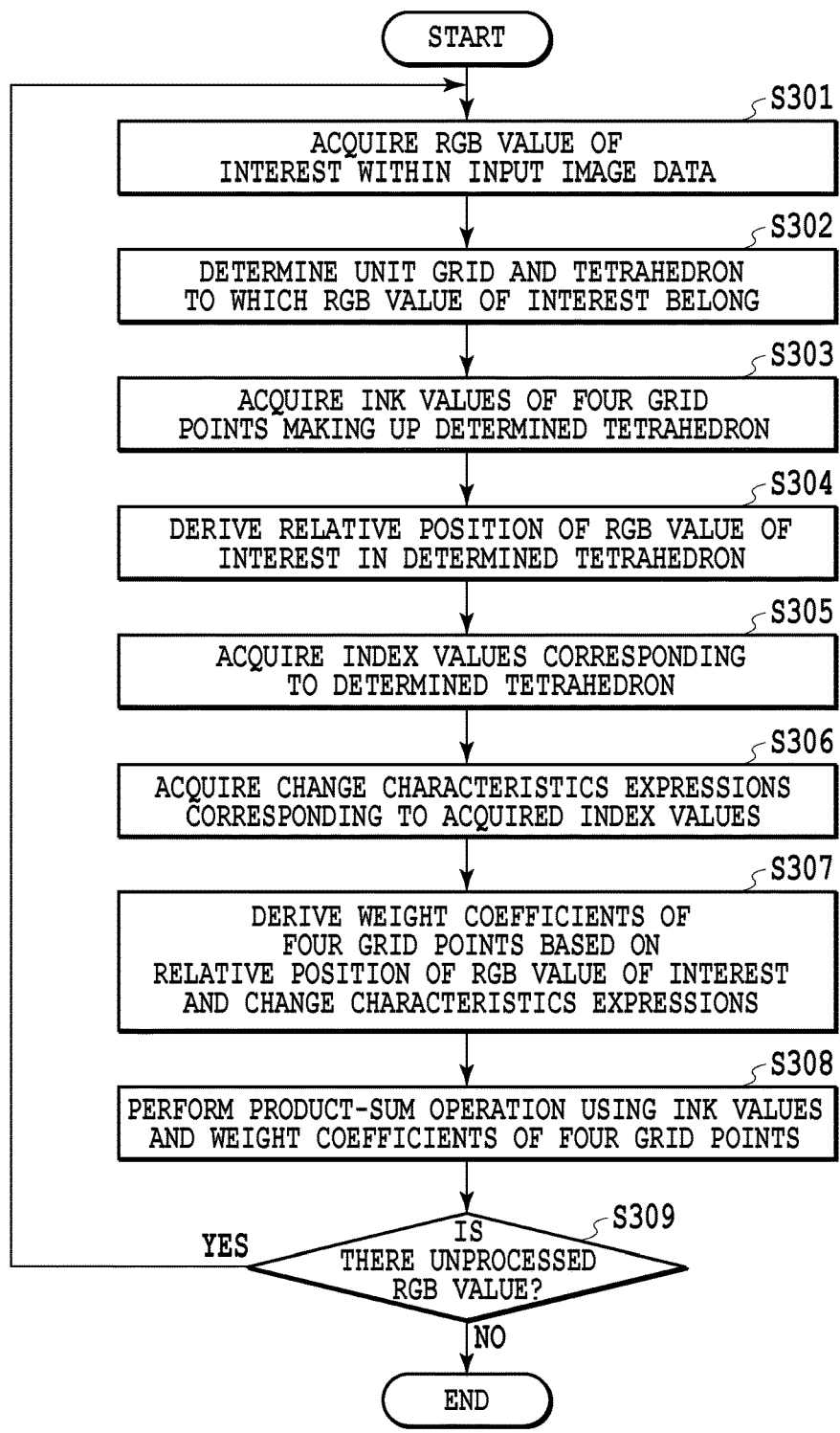
FIG. 3 is a flowchart showing details of color separation processing according to the first embodiment.

Next, details of the color separation processing that combines a three-dimensional LUT and interpolation processing are explained, which is the feature of the present embodiment. FIG. 3 is a flowchart showing details of the color separation processing according to the present embodiment. As the interpolation processing, there are a variety of pieces of interpolation processing depending on which grid points surrounding a processing-target color value are made use of as information, but in the present embodiment, explanation is given by taking tetrahedral interpolation as an example.

At step 301, from the input image data of the RGB color space received from the color matching processing unit 102 and for which the color matching processing has been performed, RGB value (hereinafter, RGB value of interest) on which attention is focused as processing-targets are acquired.

Figure 4A:
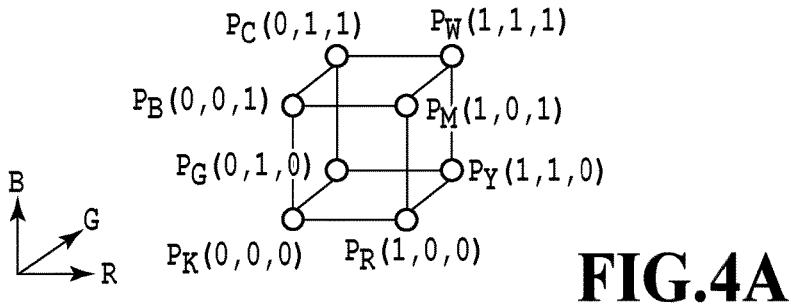
FIG. 4A is a schematic diagram of a unit grid.
Figure 4B:
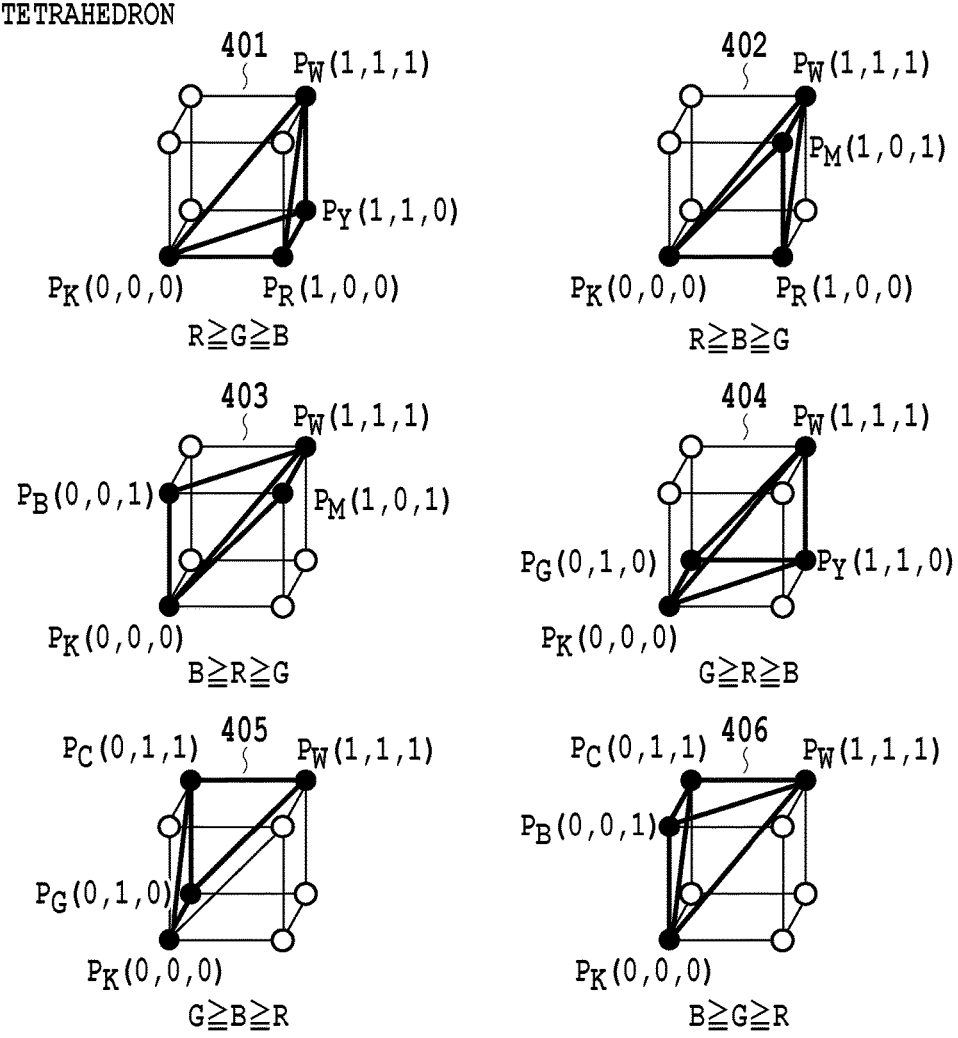
FIG. 4B is a schematic diagram of a tetrahedron.

Next, at step 302, based on the higher bits of the RGB value of interest, a unit grid and a tetrahedron to which the RGB value of interest belongs are determined. Here, the higher bits are higher four bits of eight bits that represent each value of RGB. In FIG. 4A and FIG. 4B, FIG. 4A is a schematic diagram of a unit grid and FIG. 4B shows schematic diagrams of tetrahedrons. First, determination of a unit grid is explained. In the color separation processing using tetrahedral interpolation, an input color space is divided into a plurality of unit grids along each axis of RGB and the unit grid is further divided by a tetrahedron. At the time of determining which unit grid the RGB value of interest belongs to, the higher bits of each of the RGB value of interest are referred to. Here, a table as shown in FIG. 5 is used, in which the higher four bits of the GRB values and the position of the unit grid are associated with each other. Specifically, for each value (eight bits) of RGB of input image data, the higher four bits thereof are referred to and which unit grid of the unit grids, which exist in the number of 16×16×16 in the entire RGB color space, the RGB value of interest belongs to is determined. For example, in the case where the higher four bits of the R value of the RGB value of interest are "0111", on the R-axis, the position of the start point of the unit grid is determined to be "112" and the end point to be "128". It may also be possible to determine what number unit grid the RGB value of interest belongs to by a numerical value obtained by converting the value of the higher four bits into a decimal number (in the above example, the number obtained by converting "0111" into a decimal number is "7", and therefore, the eighth unit grid in the order). Next, determination of a tetrahedron is explained. At the time of determining a tetrahedron, first, a relationship in magnitude between R, G, and B values of the RGB value of interest is obtained. Then, based on the obtained relationship in magnitude, one of six kinds of tetrahedrons 401 to 406 is determined. Each of the six kinds of tetrahedrons 401 to 406 shown in FIG. 4B is made up of four grid points indicated by black circles of the eight grid points making up the unit grid. In FIG. 4B, the relationship in magnitude by which one of the tetrahedrons 401 to 406 is determined is given below each diagram. For example, the tetrahedron 401 is a tetrahedron whose RGB value of interest satisfies a condition of "R≥G≥B" and the other tetrahedrons 402 to 406 are each also a tetrahedron determined uniquely from the relationship in magnitude between R, G, and B. In this case, each of the six kinds of tetrahedrons 401 to 406 includes two grid points: a grid point $P_k$ (0, 0, 0) and a grid point $P_w$ (1, 1, 1). In the case where the RGB value of interest is located at a boundary between tetrahedrons, a plurality of tetrahedrons including the boundary may be candidates and any tetrahedron that is a candidate may be used and for example, it may also be possible to select a tetrahedron that first satisfies the condition at the time of obtaining the relationship in magnitude. In this manner, the unit grid and the tetrahedron to which the RGB value of interest belongs are determined. Explanation is returned to the flow in FIG. 3.

At step 303, the ink values of vertexes (four grid points) making up the determined tetrahedron are acquired by referring to the color separation LUT 105a.

Figure 6:
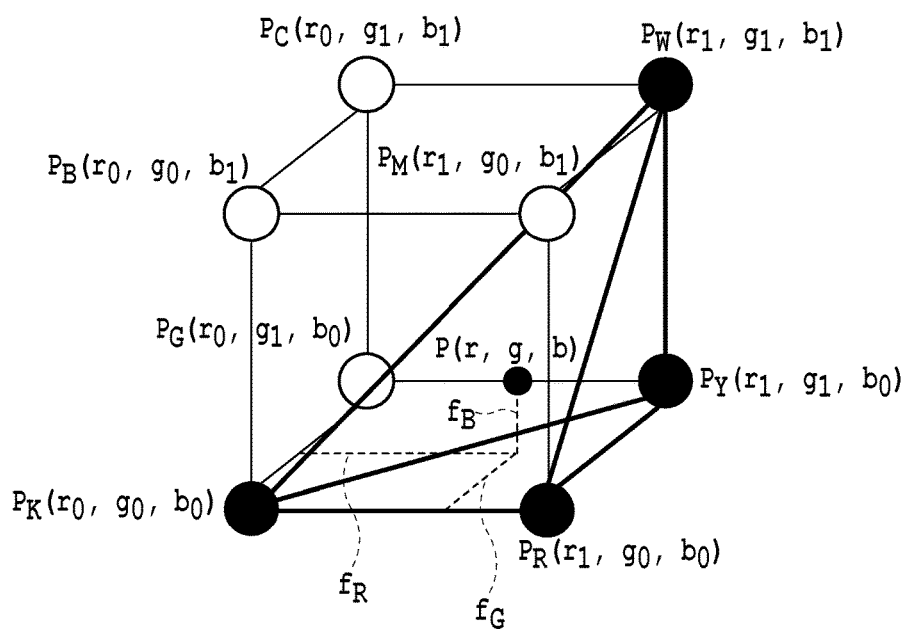
FIG. 6 is a schematic diagram showing the way a relative position of RGB value of interest in a tetrahedron is derived.

At step 304, the lower bits of the RGB value of interest are referred to and the relative position of the RGB value of interest in the tetrahedron determined at step 302 is derived. The lower bits here are lower four bits of eight bits that represent each value of RGB. FIG. 6 is a schematic diagram showing the way the relative position of the RGB value of interest in the tetrahedron is derived. Here, in the case where the RGB value of interest is taken to be P (r, g, b), relative position ($f_R$, $f_G$, $f_B$) thereof is obtained as follows by referring to the lower bits of the RGB value of interest. Here, by using a table (see FIG. 7) in which the lower four bits of the RGB value of interest and the relative position are associated with each other, the relative position in 16 steps is obtained for each axis of RGB. For example, in the case where the lower four bits of the R value of the RGB value of interest are "0100", the relative position $f_R$ thereof is "4/16". Alternatively, it may also be possible to convert the value of the lower four bits into a decimal number and a value of 0 to 15 is taken to be a numerator of the relative position. Further, it may also be possible to obtain the relative position by using expression (1) to expression (3) below. In this case, it is assumed that the position of the grid point $P_k$ is represented by ($r_0$, $g_0$, $b_0$) and the position of the grid point $P_w$ by ($r_1$, $g_1$, $b_1$).

$$f_R = (r - r_0)/(r_1 - r_0) \quad \text{expression (1)}$$

$$f_G = (g - g_0)/(g_1 - g_0) \quad \text{expression (2)}$$

$$f_B = (b - b_0)/(b_1 - b_0) \quad \text{expression (3)}$$

As is obvious from expressions (1) to (3) described above, each value of the relative position ($f_R$, $f_G$, $f_B$) is a value represented by a ratio between "0 and 1". Explanation is returned to the flow in FIG. 3.

At step 305, the index value as change characteristics identification information corresponding to the tetrahedron determined at step 302 is acquired for each axis of RGB from the change characteristics identification information DB 105b. As described above, the index value in the present embodiment is one of values "0 to 4" specifying one of mathematical expressions that indicate the five kinds of change characteristics. FIG. 8 is an example of a table showing a correspondence relationship between the RGB values of input image data, the ink value, and the index values for the black ink. As described previously, the ink value of each grid point is stored in the color separation LUT 105a and the index value is stored in the change characteristics identification information DB 105b. An index value C_K (R, G, B) for the black ink, which corresponds to the RGB values of the input image data, is expressed by expression (4) below.

$$C\_K(R,G,B) = \{C\_K_R(R,G,B), C\_K_G(R,G,B), C\_K_B(R,G,B)\} \quad \text{expression (4)}$$

As described above, along with the ink value of each grid point, the index value in the tetrahedron to which each grid point belongs is prepared for each axis direction of RGB.

For example, for the tetrahedron to which the grid point whose RGB value are (0, 0, 0) belongs, the index value for each of the R-axis, the G-axis, and the-B axis is prepared, such as an index value C_K (0, 0, 0)={2, 2, 3}. Then, for each of the other ink colors (cyan, magenta, yellow), a similar table in which the ink value and the index values are associated with the RGB values of input image data is prepared. In this case, each index value of cyan, magenta, and yellow is expressed by expression (5) to expression (7) below.

$$C\_C(R,G,B)=\{C\_C_R(R,G,B),C\_C_G(R,G,B),C\_C_B(R,G,B)\} \quad \text{expression (5)}$$

$$C\_M(R,G,B)=\{C\_M_R(R,G,B),C\_M_G(R,G,B),C\_M_B(R,G,B)\} \quad \text{expression (6)}$$

$$C\_Y(R,G,B)=\{C\_Y_R(R,G,B),C\_Y_G(R,G,B),C\_Y_B(R,G,B)\} \quad \text{expression (7)}$$

At step 306, a change characteristics expression as change characteristics information corresponding to the index value for each axis of RGB acquired at step 305 is acquired from the change characteristics information DB 105c. As described above, the change characteristics expression is a conversion expression by which an output value is obtained in the case where the relative position and the index value of each axis of RGB are input and the change characteristics expression is associated with the above-described index value. In the case where an index value c is in five steps of "0 to 4" and each axis of RGB axes is x (x indicates one of R, G, B), a change characteristics expression $f'_x(c)$ is expressed by expression (8) to expression (12) below.

In the case where the index value is 0

$$f'_x(0)=1-(1-f_x)^{2.5} \quad \text{expression (8)}$$

In the case where the index value is 1

$$f'_x(1)=1-(1-f_x)^{1.4} \quad \text{expression (9)}$$

In the case where the index value is 2

$$f'_x(2)=f_x \quad \text{expression (10)}$$

In the case where the index value is 3

$$f'_x(3)=f_x^{1.4} \quad \text{expression (11)}$$

In the case where the index value is 4

$$f'_x(4)=f_x^{2.5} \quad \text{expression (12)}$$

The exponent on the right side in each of expression (8) to expression (12) described above is for controlling the degree of a change in change characteristics and by this exponent, it is possible to adjust the degree of a change in each of the change characteristics. Further, the change characteristics expression is not limited to expression (8) to expression (12) described above, and any increasing continuous function may be used as long as the function uniquely determines the value of $f'_x$ for $f_x$. Furthermore, in the present embodiment, expression (8) to expression (12) described above are used in common to each ink color, but in the case where the change characteristics between adjacent grid points differ considerably depending on the ink color, it may also be possible to prepare different change characteristics expressions for each ink color. FIG. 9 is a diagram showing each of the change characteristics expressions (8) to (12) described above associated with each index value as a graph of $f'_x$ for $f_x(c)$. As is obvious from FIG. 9, for each index value of "0 to 4", each graph has the feature of being convex upward (degree is high), the feature of being convex upward (degree is low), the feature of being liner, the feature of being convex downward (degree is low), and the feature of being convex downward (degree is high). Explanation is returned to the flow in FIG. 3.

At step 307, based on the relative position of the RGB value of interest derived at step 304 and the change characteristics expressions acquired at step 306, weight coefficients of the four grid points making up the tetrahedron determined at step 302 are derived. FIG. 10 is a table in which the four grid points of each of the six tetrahedrons 401 to 406 shown in FIG. 4B and the weight coefficients corresponding to the four grid points are put together. Here, weight coefficients $w_1$ to $w_4$ are set so that the total of the weight coefficients $w_1$ to $w_4$ is 1.0. As described previously, which tetrahedron the grid points belong to is determined by the relationship in magnitude between R, G, and B and for four grid points $P_1$, $P_2$, $P_3$, and $P_4$ of the determined tetrahedron, the weight coefficients $w_1$ to $w_4$ whose contents are shown in FIG. 10 are derived.

At step 308, an output value corresponding to the RGB value of interest is derived by interpolation processing using tetrahedral interpolation. Specifically, a product-sum operation using the ink values of the four grid points acquired at step 303 and the weight coefficients derived at step 307 is performed. An interpolated value (ink value) V that is obtained by this product-sum operation is expressed by expression (13) below.

$$V=\Sigma(w_i \times P_i)=w_1 \times P_1 + w_2 \times P_2 + w_3 \times P_3 + w_4 \times P_4 \quad \text{expression (13)}$$

For example, in the case where $(P_1, P_2, P_3, P_4)$=(100, 120, 100, 80) and $(w_1, w_2, w_3, w_4)$=(0.4, 0.3, 0.2, 0.1), the interpolated value V is 0.4×100+0.3×120+0.2×100+0.1×80=104.

At step 309, whether the processing has been completed for all the pixel values (RGB values) within the input image data is determined. In the case where the processing has been completed for all the pixel values, the color separation processing is terminated. On the other hand, in the case where there is an unprocessed pixel value, the processing returns to step 301 and the next RGB value of interest is determined and the processing is continued.

The above is the contents of the color separation processing according to the present embodiment. By the above-described color separation processing, it is possible to obtain an interpolated value (ink value) corresponding to each of RGB values of input image data. FIG. 11A and FIG. 11B are each a graph representing a change in the interpolated value (ink value) obtained by the interpolation processing of the present embodiment. In each graph, the horizontal axis represents the input value (one of RGB) and the vertical axis represents the output value (ink value) obtained by the interpolation processing. The five graphs arranged vertically in FIG. 11A are graphs in the case where the ink value increases between adjacent grid points and it is known that the characteristics change from being convex upward to being convex downward as the index value increases. The five graphs arranged vertically in FIG. 11B are graphs in the case where the ink value decreases between adjacent grid points and it is known that the characteristics change from being convex downward to being convex upward as the index value increases. By controlling the index value, it is possible to implement interpolation processing whose change characteristics of the ink value between adjacent grid points are different.

(Creation Method of Color Separation LUT and Index Value)

Subsequently, a creation method of the multidimensional LUT and the index value as the change characteristics identification information used for the above-described color separation processing is explained. In the present embodiment, a case is explained where the three-dimensional LUT having 17×7×17 grid points corresponding to input image data represented by the RGB color space and the index value having one of values "0 to 4" described above are created.

(Creation of Color Separation LUT)

Figure 12:
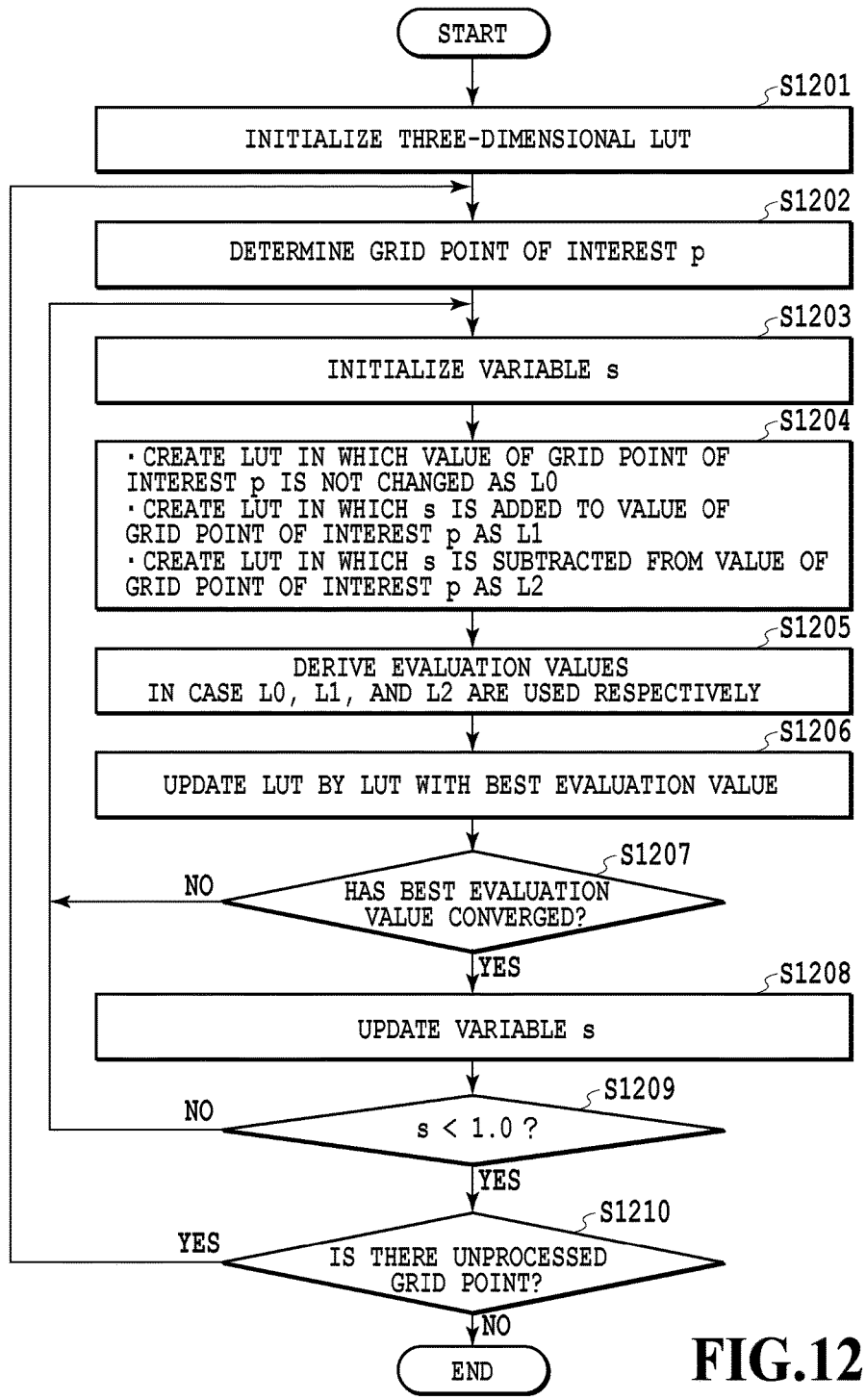
FIG. 12 is a flowchart showing a flow of creation of a three-dimensional color separation LUT.

FIG. 12 is a flowchart showing a flow of creation of the three-dimensional color separation LUT according to the present embodiment. This processing is performed for each kind of ink of CMYK.

At step 1201, a three-dimensional LUT to be created is initialized. Specifically, based on the three-dimensional LUT (number of grid points: 65×65×65), which is the target of interpolation, designed by the developers and the like of the printer 20, a provisional ink value is set to each grid point of the three-dimensional LUT (number of grid points: 17×17×17) used for the actual color separation processing. In the case of the present embodiment, by thinning the grid point values in the target LUT, an initial value is given to each grid point of the target three-dimensional LUT. The three-dimensional LUT (target LUT) that is the target of interpolation is prepared in advance by the developers and the like of the printer 20. The target LUT has more grid points than the grid points of the three-dimensional LUT used for the actual color separation processing in order to reproduce the change characteristics between adjacent grid points of the three-dimensional LUT used for the actual color separation processing.

At step 1202, one grid point (grid point of interest p) that is a target of processing is determined from all the grid points of the three-dimensional LUT to be created. In the stage immediately after the start of processing, for example, the grid point at the position (0, 0, 0) is selected as the grid point of interest p.

At step 1203, the value of a variable s is initialized. Here, the variable s is a variable indicating a range of variation to find the optimum grid point value (ink value). The initial value may be set arbitrarily and in the present embodiment, "10" is set.

At step 1204, three kinds of LUT, i.e., L0, L1, and L2, are created by using the ink value of the grid point of interest p and the range of variation given by the variable s. L0 is an LUT in which the ink value of the grid point of interest p is not changed and no variation is applied, L1 is an LUT in the case where s is added to the ink value of the grid point of interest p, and L2 is an LUT in the case where s is subtracted from the ink value of the grid point of interest p.

At step 1205, evaluation values E0, E1, and E2 in the case where interpolated values are calculated by using the three kinds of LUTs (L0, L1, L2), respectively, obtained at step 1204 are derived. Here, as the evaluation value, the total (sum of squared difference) of values, each of which is obtained by squaring a difference between the grid point value (target value) of the target LUT and the interpolated value (ink value) calculated by the present method of the corresponding grid point position, is used. In this case, the smaller the error, the smaller the evaluation value becomes, and therefore, the smallest evaluation value of E0, E1, and E2 is the best evaluation value. However, the evaluation method is arbitrary and it may also be possible to perform evaluation by using the maximum value of the error in place of using the above-described sum of squared difference. Further, it may also be possible to evaluate the error after converting the ink value into a value represented by the uniform color space, such as L*a*b*. Furthermore, it may also be possible to use smoothness of a change in the ink value and L*a*b* as the evaluation value. Still furthermore, it may also be possible to use a comprehensive evaluation value obtained by combining these evaluation values by the product-sum operation.

At step 1206, the evaluation values E0, E1, and E2 derived at step 1205 are compared. Then, the LUT whose evaluation is the best (here, the smallest) is held (updated) as the best LUT at the current time.

At step 1207, whether the best evaluation value has converged is determined. As the criterion of the determination, in the case where the evaluation value of the best LUT currently held is equal to the evaluation value E0 without variation, the best evaluation value is regarded as having converged. In the case where the results of the determination indicate that the best evaluation value has not converged, the processing returns to step 1203 and the processing is continued. On the other hand, in the case where the best evaluation value has converged, the processing advances to step 1208.

At step 1208, the value of the variable s is updated. In the present embodiment, a value obtained by dividing the current value by "2" is taken to be a new value of the variable s. However, it is only required to be capable of reducing the value to a smaller value stepwise and the method of updating the variable s is not limited to this.

At step 1209, whether the value of the variable s is less than "1.0" is determined. In the case where the value of the variable s is greater than or equal to "1.0", the processing returns to step 1203 and the processing is continued. On the other hand, in the case where the value of the variable s is less than "1.0", the processing advances to step 1210.

At step 1210, whether the processing has been completed for all the grid points of the creation-target three-dimensional LUT is determined. In the case where there is an unprocessed grid point, the processing returns to step 1202 and the next grid point is determined to be the grid point of interest p and the processing is continued. On the other hand, in the case where the processing has been completed for all the grid points, the present processing is terminated.

In the manner as described above, a three-dimensional color separation LUT having optimum grid point values (ink values) is created.

(Creation of Index Value)

Figure 13:
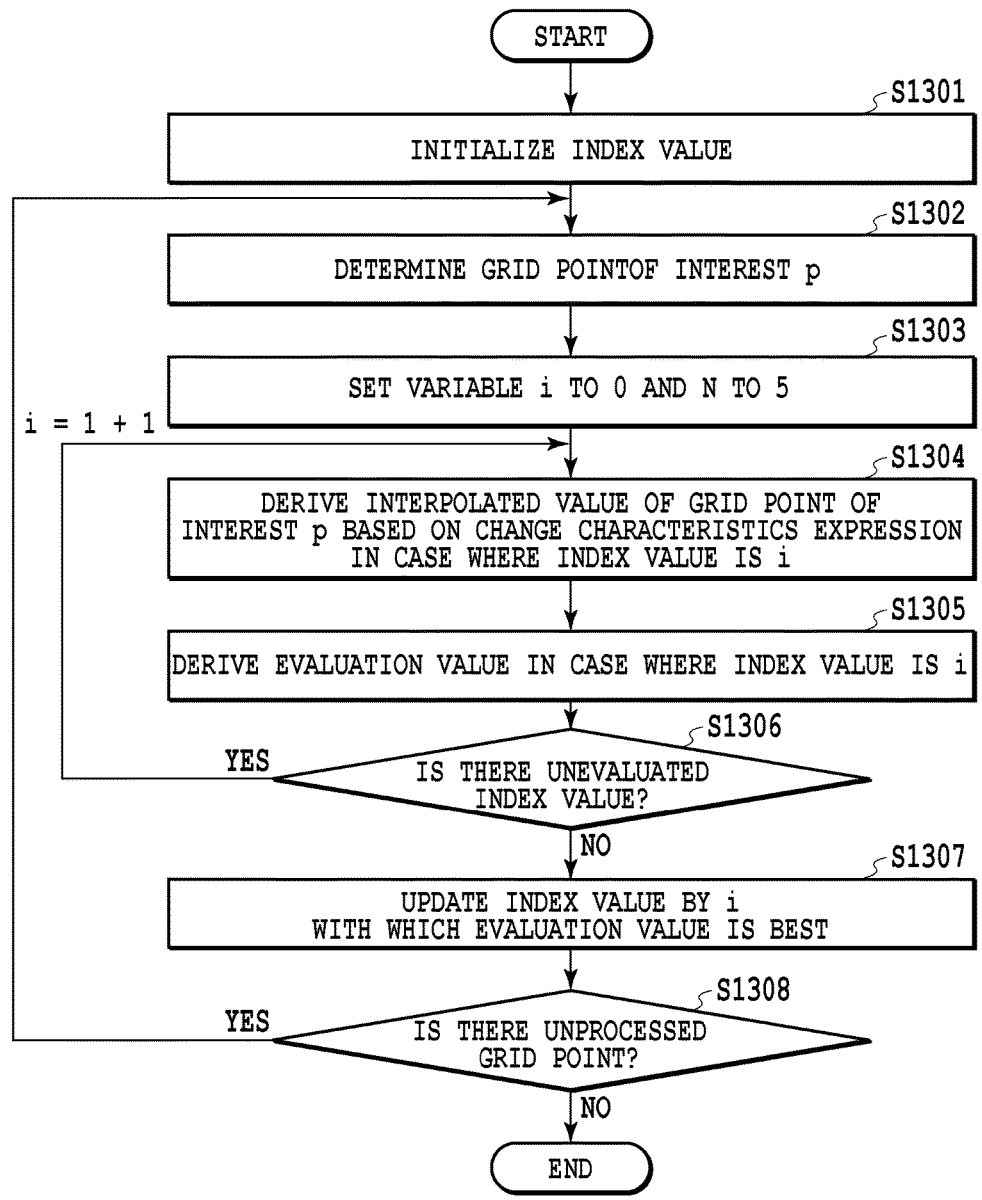
FIG. 13 is a flowchart showing a flow of index value creation.

FIG. 13 is a flowchart showing a flow of index value creation according to the present embodiment. It is assumed that at the time of execution of the following processing, the previously described five kinds of change characteristics expression are created in advance and prepared in the state where reading is possible.

At step 1301, the index value is initialized. Specifically, as the initial value of the index value of each of all the grid points of the three-dimensional LUT used for the color separation processing, "2" indicating the change characteristics expression in the case where the change between adjacent grid points is linear is set.

At step 1302, from all the grid points of the three-dimensional LUT, one grid point on which attention is focused (grid point of interest p) is determined. In the stage immediately after the start of processing, for example, the grid point at the position (0,0,0) is selected as the grid point of interest p.

At step 1303, a variable i indicating an index value and a constant N indicating the number of index values are set. In the present embodiment, as the initial value of the variable i, "0" is set and as the value of the constant N, "5" is set.

At step 1304, based on the change characteristics expression in the case where the index value is the variable i, an interpolated value of the grid point of interest p is derived.

At step 1305, the evaluation value in the case where the index value is the variable i is derived. As this evaluation value also, the total (sum of squared difference) of the values, each of which is obtained by squaring a difference between the grid point value (target value) of the target LUT and the interpolated value (ink value) calculated by the present method of the corresponding grid point position, is used as at the time of optimization of the grid point value of the three-dimensional LUT.

At step 1306, whether the evaluation of all the index values has been completed is determined. In the case where there is an unevaluated index value (in the case where the value of the variable i is less than N−1), the variable i is incremented (i=i+1) and the processing returns to step 1304 and the processing is continued for the next index value i. On the other hand, in the case where the evaluation of all the index values has been completed (in the case where the value of the variable i has reached N−1), the processing advances to step 1307.

At step 1307, based on the evaluation value of each index value (variable i is 0 to 4), the variable i with which the evaluation value is the best is determined to be the index value of the grid point of interest p.

At step 1308, whether the processing of all the grid points of the three-dimensional LUT has been completed is determined. In the case where there is an unprocessed grid point, the processing returns to step 1302 and the next grid point is determined to be the grid point of interest p and the processing is continued. On the other hand, in the case where the processing of all the grid points has been completed, the present processing is terminated.

In the manner as described above, the index value of each grid point of the three-dimensional LUT is created.

Effect of Present Embodiment

Figure 14A:
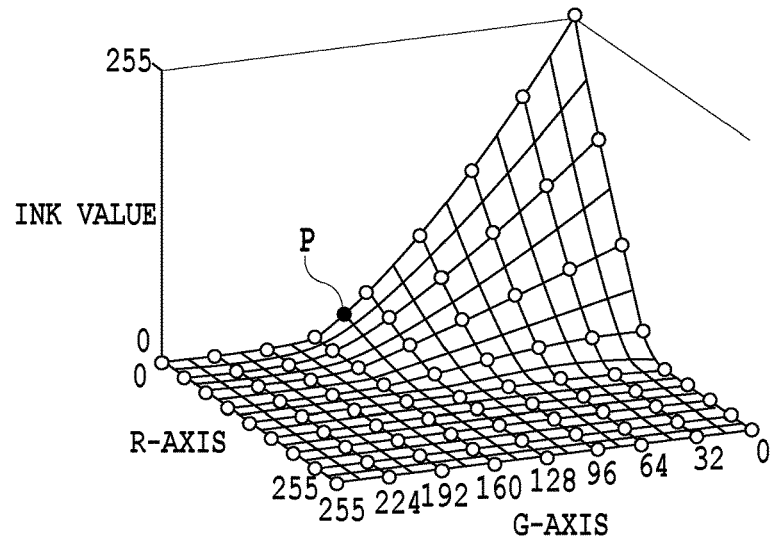
FIG. 14A and FIG. 14B are each a graph representing ink values on grid points in the three-dimensional color separation LUT.
Figure 14B:
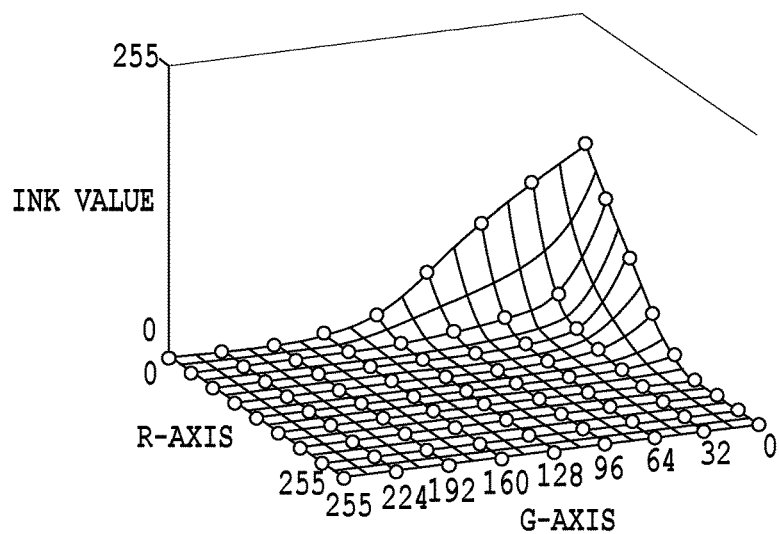

In the following, the effect of controlling the change characteristics (nonlinear) of the output value between adjacent grid points for each of the RGB axes of each unit grid is explained. FIG. 14A and FIG. 14B are each a graph representing the ink values on the grid points in the three-dimensional color separation LUT. FIG. 14A is a graph in which the ink values on the grid points (in the number of 9×9) on the plane made up of the R-axis and the G-axis are plotted in the case where the B value of the input RGB value is "0" and FIG. 14B is that in the case where the B value of the input RGB value is "144". The ink value of CMYK for the input GRB value are four-dimensional information, and therefore, due to the limitation to visualization, the B value that is one of the dimensions of the input is fixed to a fixed value and two examples of the cases where the B values are different are shown. It is known from a comparison between both the graphs that the change characteristics of the ink value between adjacent grid points may be different for each of the RGB axes of the unit grid depending on the input RGB value. At this time, a grid point P in FIG. 14A is a grid point whose RGB value is (0, 144, 0) and in the following, explanation is given in detail by focusing attention on this grid point P.

Figure 15A:
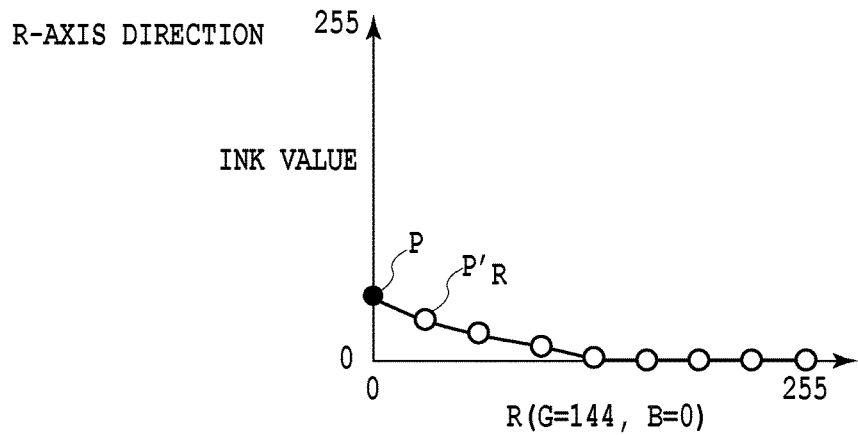
FIG. 15A to FIG. 15C are each a graph representing a change in the ink value in each axis direction of RGB.
Figure 15B:
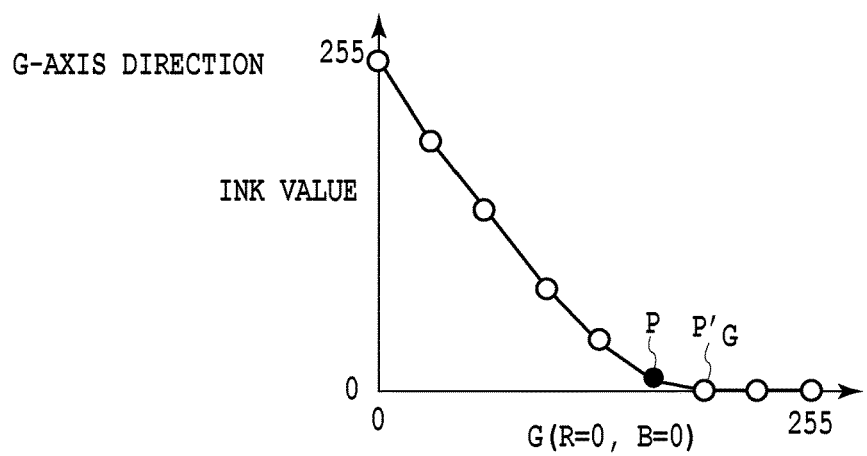
Figure 15C:
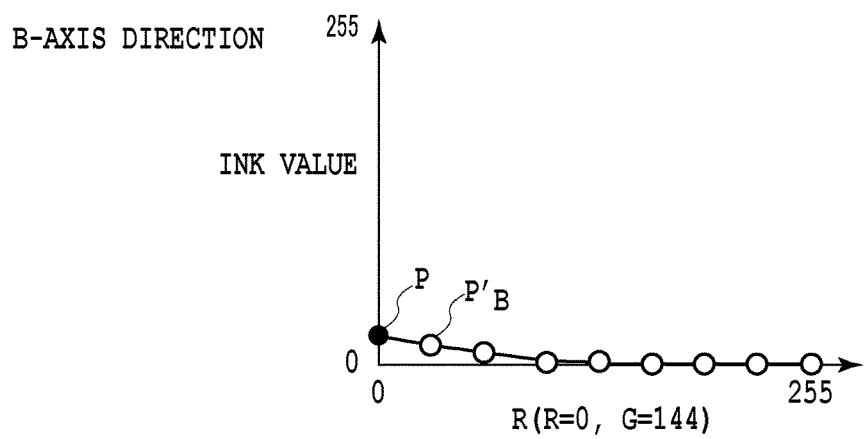

FIG. 15A to FIG. 15C are each a graph representing a change in the ink value in each axis direction of RGB. FIG. 15A to FIG. 15C show a change in the ink value in the R-axis direction, the G-axis direction, and the B-axis direction, respectively. The black circle in each of FIG. 15A to FIG. 15C indicates the above-described grid point P and a grid point adjacent to the grid point P in the positive direction along each axis is taken to be, $P'_R$, $P'_G$, and $P'_B$, respectively. From FIG. 15A to FIG. 15C, it is known that the characteristics of a change in the index value between adjacent grid points $P'-P_R$, those between adjacent grid points $P-P'_G$, and those between adjacent grid points $P-P'_B$ in the respective axis directions are different. In particular, in the case of FIG. 15B in which the grid point P is located in the area where the ink value begins to take a significant value, it is understood that a smoother increase in the ink value is desirable.

With the above-described fact being taken into consideration, in the present embodiment, each grid point is caused to have information on the change characteristics between adjacent grid points (change characteristics expression) in order to implement different change characteristics in different axis directions for each grid point. Then, by causing each grid point to have an index value to identify the change characteristics information rather than causing each grid point to have the change characteristics information itself, the amount of information is reduced. Further, in the case of the method of the present embodiment, at the time of changing the change characteristics between adjacent grid points for each of the RGB axes, only the grid points included in the interpolation-target unit grid, the index value corresponding thereto, and the change characteristics expression are referred to. Because of this, the number of reference points and the amount of calculation are reduced compared to a high-order interpolation method that performs interpolation by referring also to peripheral grid points in a wider range, for example, such as spline interpolation, Bezier interpolation, and NURBS interpolation.

In the present embodiment, all the grid points (excluding the grid point whose position coordinate is the maximum value along each axis) of the color separation LUT are caused to have the index value, but a configuration may be accepted in which only part of grid points are caused to have the index value. For example, it may also be possible to cause only the grid points in the halftone area to have the index value for a pale-color ink and to cause only the grid points in the dark area to have the index value for a dark-color ink.

In the present embodiment, for all kinds of ink used in the printer 20, the index value and the change characteristics expression are prepared, but a configuration may be accepted in which the index value and the change characteristics expression are prepared for part of ink colors. For example, it may also be possible to prepare the index value and the change characteristics expression for only the three colors (cyan, magenta, black) except for yellow of the four colors of CMYK.

Further, a configuration may be accepted in which only part of the RGB axes have the index value and the change characteristics expression. For example, a configuration may be accepted in which the cyan ink has the index value and the change characteristics expression for only G and B axes, the magenta ink has those for only the R and B axes, and the yellow ink has those for only the R and G axes. In this case, there is a possibility that the accuracy of the interpolation processing is reduced somewhat, but it is possible to reduce the amount of information to be stored.

As the method of interpolation processing between adjacent grid points, it is possible to widely apply any interpolation as long as the interpolation is polyhedral interpolation and to perform another method that uses a three-dimensional structure, for example, such as a pyramid, a prism, a cube, and a cuboid, other than a tetrahedron.

As the configuration of the print head 111, the example is shown in which inks in four colors, i.e., cyan (C), magenta (M), yellow (Y), and black (K) are provided, but the number of inks and the kinds of ink are not limited to this example. It may also be possible to use a pale-color ink whose density is low, a special color ink in red, green and the like, and a white ink. Further, it may also be possible to user a colorless transparent clear ink and a metallic ink.

Furthermore, as input image data, an RGB color image is used, but input image data is not limited to this and may be, for example, a CMYK color image. In this case, the index value is allocated to each grid point for each dimension of the C-axis, the M-axis, the Y-axis, and the K-axis. Further, a component other than color, for example, a component representing gloss and a component representing a distance may be included. In this case, the multidimensional LUT used for color separation processing will be an LUT whose number of dimensions is four or more. FIG. 16A is a table showing an example of a color separation LUT in the case where input image data is represented by the CMYK color space and index values set to each grid point. Then, FIG. 16B is a table showing an example of a color separation LUT in the case where input image data is represented by the RGB color space and the input image data further has information on gloss and index values set to each grid point. In the table in FIG. 16B, X in the input image data indicates a gloss component and the larger the value of X, the higher glossiness is (the mount of specularly reflected light is large) and the more clear ink is used (the ink value is large). FIG. 16B shows an example of the case where glossiness on the color dark portion side is high and glossiness on the color bright portion side is low. By preparing a color separation LUT in accordance with components of input image data and index values as described above, it is possible to obtain the same effect.

Further, interpolation operation between adjacent grid points is performed by using the change characteristics expression for each of the RGB axes, but it may also be possible to use a change characteristics table including a finite number of entries prepared in advance in place of the change characteristics expression. As a change characteristics table, an LUT is considered that has the feature of the graph of each change characteristics expression described previously (see FIG. 9), which specifies a relationship between input values and output values in a predetermined number (e.g., ten values). In the case where the table such as this is used in place of the change characteristics expression, it is no longer necessary to perform an exponential operation, and therefore, it is possible to further reduce the processing load.

As explained above, according to the present embodiment, in a multidimensional LUT used at the time of performing color separation processing of input image data, it is possible to set nonlinear change characteristics for each input component of the input image data and for each portion between adjacent grid points. Due to this, even in the case where the change characteristics of interpolation between adjacent grid points are different in each direction of the RGB axes, it is possible to suppress the accuracy from deteriorating, which is cased by an interpolation operation, and to further improve smoothness of gradation at each portion between adjacent grid points.

Second Embodiment

In the first embodiment, the example is explained in which the change characteristics of interpolation between adjacent grid points are changed for each of the RGB axes within each unit grid at the time of performing color separation by the interpolation processing using the three-dimensional LUT. Next, an aspect is explained as a second embodiment in which the accuracy of the interpolation operation is improved by performing nonlinear conversion using a one-dimensional LUT before performing color separation by interpolation processing using a three-dimensional LUT. Explanation of the portions in common to those of the first embodiment is simplified or omitted and in the following, different points are explained mainly.

(Configuration of Apparatus)

Figure 17:
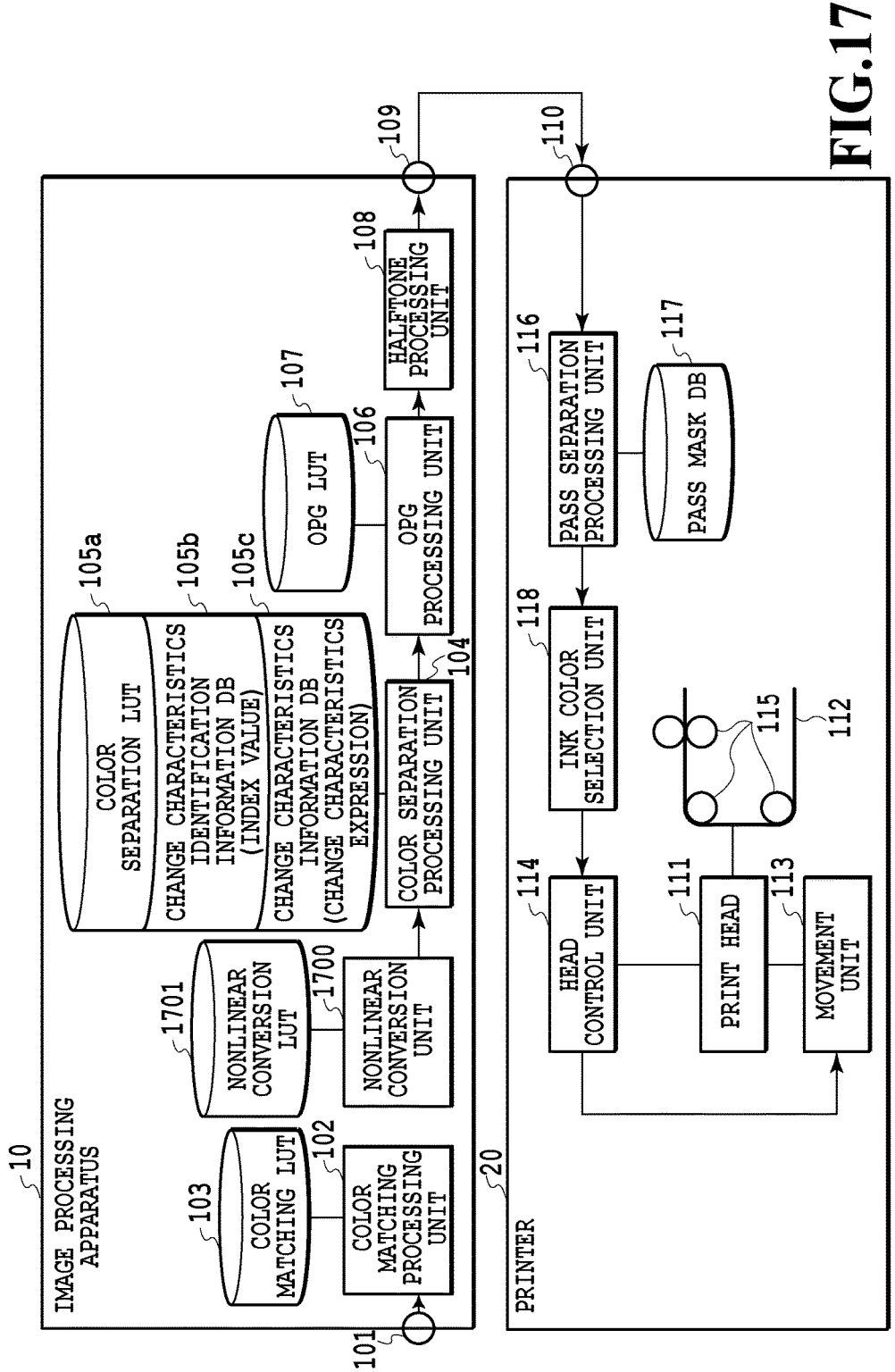
FIG. 17 is a block diagram showing an example of a configuration of a printing system according to a second embodiment.

FIG. 17 is a block diagram showing an example of a configuration of a printing system according to the present embodiment. FIG. 17 differs from FIG. 1 of the first embodiment in that a nonlinear conversion unit 1700 is inserted between the color matching processing unit 102 and the color separation processing unit 104 and that a nonlinear conversion LUT 1701 referred to by the nonlinear conversion unit 1700 is added.

Figure 18:
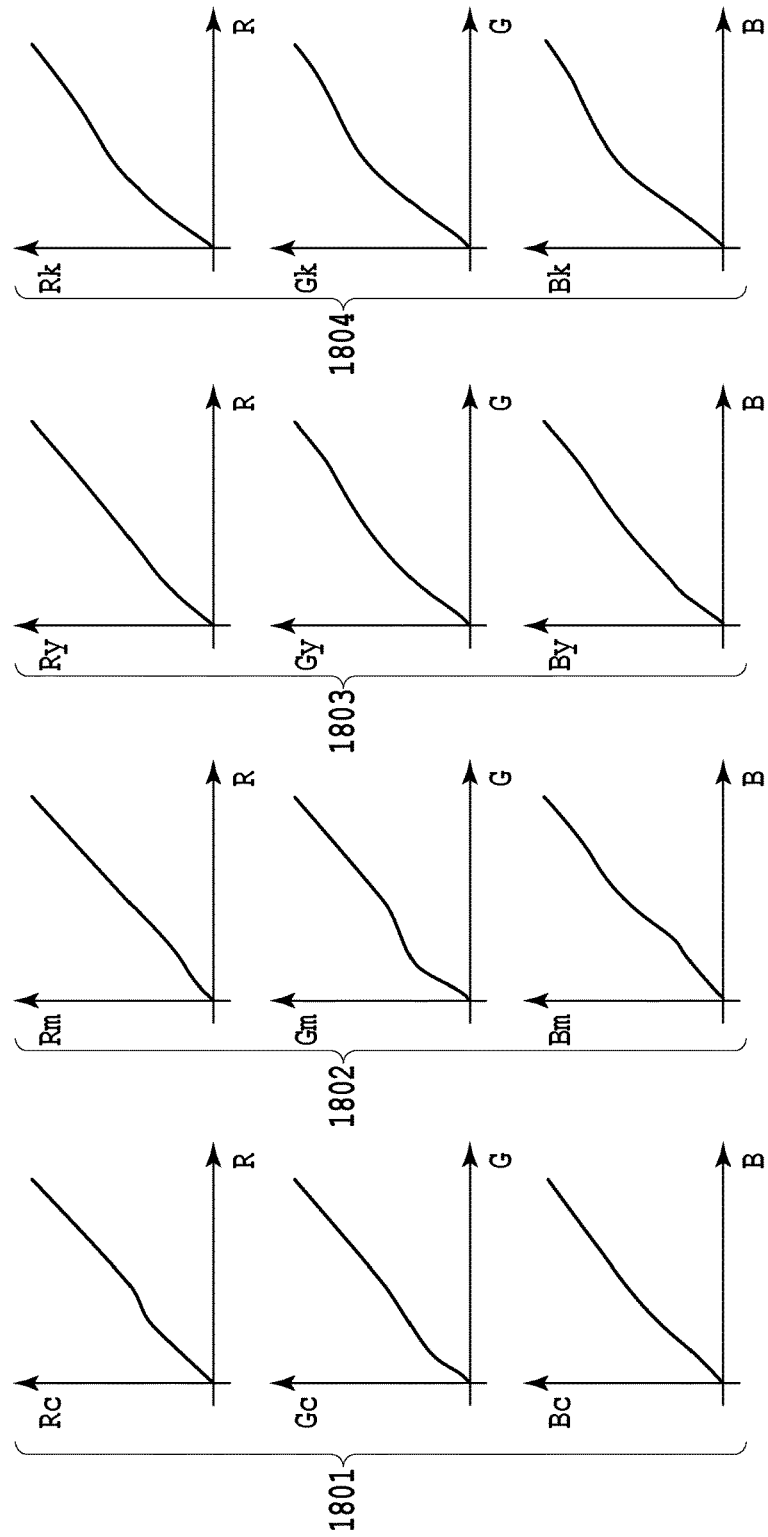
FIG. 18 is a diagram showing an example of a nonlinear conversion LUT.

The nonlinear conversion unit 1700 performs nonlinear conversion for image data for which color matching processing has been performed. Nonlinear conversion processing is performed for each ink color provided in the printer 20. Here, the print head 111 mounts the four color inks: cyan (C), magenta (M), yellow (Y), and black (K). At the time of nonlinear conversion processing, a one-dimensional nonlinear conversion LUT stored in the HDD or the like, not shown schematically, is used. FIG. 18 shows examples of nonlinear conversion LUTs and the horizontal axis represents one of input RGB values and the vertical axis represents one of output RGB values (after nonlinear conversion). An LUT 1801 corresponds to cyan, an LUT 1802 to magenta, an LUT 1803 to yellow, and an LUT 1804 to black, respectively. In each LUT, output values corresponding to 8-bit input values are described on only 17 grid points, respectively.

(Outline of Printing Processing)

Figure 19:
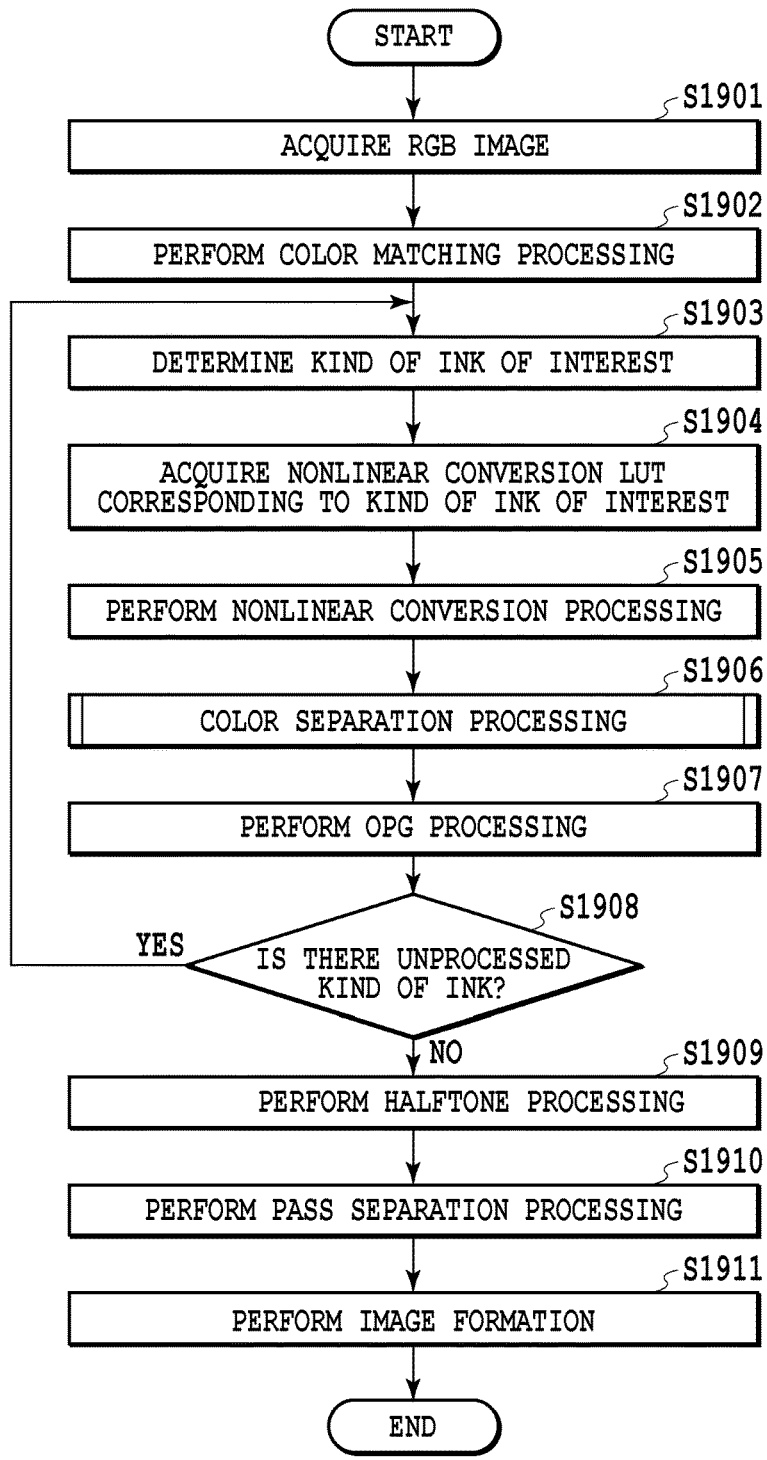
FIG. 19 is a flowchart showing a rough flow of printing processing according to the second embodiment.

Next, an outline of printing processing in a printing system 100 according to the present embodiment is explained. FIG. 19 is a flowchart showing a rough flow of the printing processing in the printing system 100 according to the present embodiment.

Steps 1901 to 1903 are the same as steps 201 to 203 in the flow in FIG. 2 of the first embodiment. That is, in the case where color matching processing is performed (S1902) for input RGB image data (S1901), the RGB image data is sent to the nonlinear conversion unit 1700 and a kind of ink of interest that is a target of color separation processing is determined (S1903).

At step 1904, the nonlinear conversion unit 1700 acquires a nonlinear conversion LUT in accordance with the kind of ink of interest determined at step 1903. Here, it is assumed that the LUT 1801 corresponding to cyan is acquired.

At step 1905, the nonlinear conversion unit 1700 converts the image data for which color matching processing has been performed into image data in accordance with characteristics (nonlinear) for each color component of the output value by using the nonlinear conversion LUT acquired at step 1904. In the case where the kind of ink of interest is cyan, the image data for which color matching processing has been performed is converted into image data in accordance with the characteristics (nonlinear) of cyan.

Subsequent steps 1906 to 1911 are the same as steps 204 to 209 in the flow in FIG. 2 of the first embodiment. However, contents of the color separation processing at step 1906 are different from those of the first embodiment, and therefore, in the following, the color separation processing of the present embodiment is explained.
(Details of Color Separation Processing)

Figure 20:
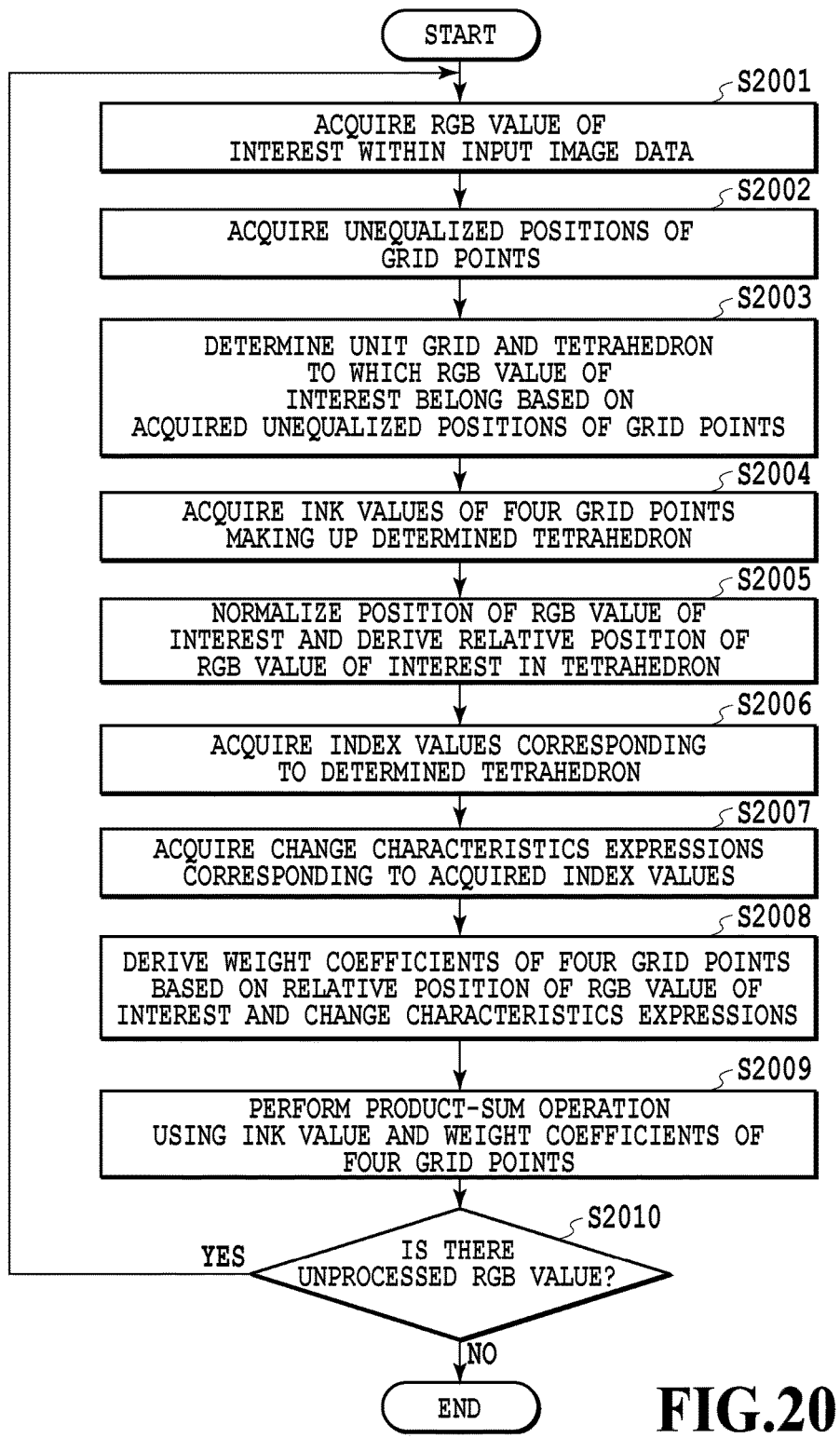
FIG. 20 is a flowchart showing details of color separation processing according to the second embodiment.

FIG. 20 is a flowchart showing details of the color separation processing according to the present embodiment.

At step 2001, from the image data about the kind of ink of interest that is received from the nonlinear conversion unit 1700 and for which the nonlinear conversion processing has been performed, RGB value of interest that is a target of processing are acquired.

At step 2002, unequalized positions of the grid points due to nonlinear conversion are acquired. It is sufficient to store the information on the unequalized positions in the HDD or the like by obtaining in advance the position of each grid point by calculation in the case where grid points at equal intervals become grid points at unequal intervals due to the nonlinear conversion by the nonlinear conversion unit 1700.

At step 2003, the unequalized positions of the grid points acquired at step 2002 are referred to and the unit grid and the tetrahedron to which the RGB value of interest belongs are determined.

At step 2004, the positions of the RGB value of interest for the unequalized positions of the grid points acquired at step 2002 are normalized and then the relative position of the RGB value of interest in the tetrahedron determined at step 2003 is derived. Subsequent steps 2006 to 2010 are the same as steps 305 to 309 in the flow in FIG. 3 of the first embodiment, and therefore, explanation is omitted.

The above is the contents of the color separation processing according to the present embodiment. As described above, in the color separation processing of the present embodiment, nonlinear conversion is performed for the input image data for each output color and the intervals of grid points are unequalized. Then, the position relationship (distance) at each portion between adjacent grid points is normalized and then the relative position of the RGB value of interest is derived. Due to this, even for the unit grid whose position relationship (distance) between adjacent grid points is different, it is possible to perform interpolation processing using the same change characteristics information (change characteristics expression) as that of the first embodiment.
(Creation Method of Nonlinear Conversion LUT)

Figure 21:
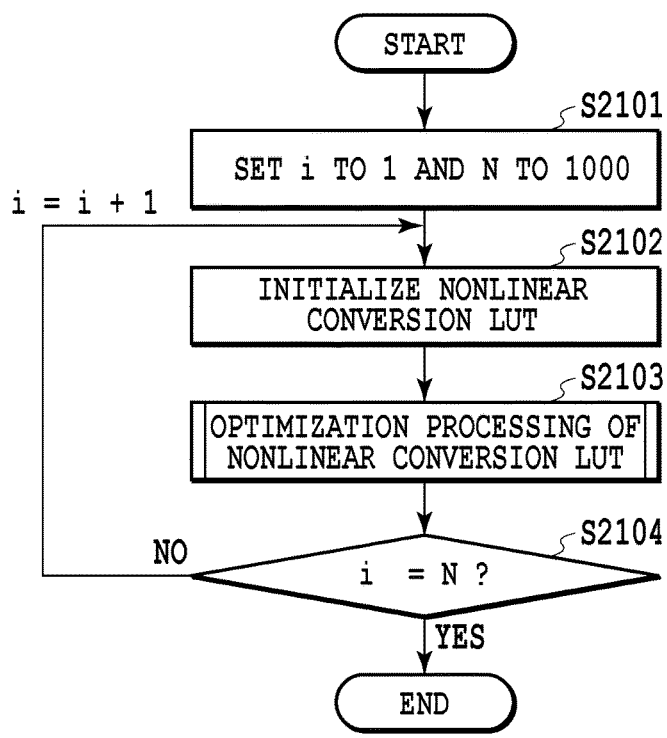
FIG. 21 is a flowchart showing a flow of creation of a nonlinear conversion LUT.

Subsequently, a creation method of a one-dimensional LUT used for nonlinear conversion processing is explained. FIG. 21 is a flowchart showing a flow of nonlinear conversion LUT creation.

At step 2101, a variable i indicating the number of times of loop of the routine (S2102 to S2104) in this flow and a constant N specifying the upper limit of the number i of times of loop are set. Here, it is assumed that "1" is set to the variable i and "1000" is set to the constant N. The value of the constant N is arbitrary.

At step 2102, the nonlinear conversion LUT is initialized. In this initialization, the positions and the initial values of the 17 grid points of the nonlinear conversion LUT are set. It is assumed that the positions of the grid points are located at equal intervals, such as 0, 16, 32, . . . , 240, and 255. Then, as the initial value of each grid point, one value of "0 to 255" is given randomly. However, the value of each grid point is set so as to increase monotonically with respect to the grid point position. By giving the initial value randomly as described above and repeating optimization processing, to be described below, the number of times corresponding to the predetermined number of times of loop, it is possible to obtain an LUT with a higher accuracy.

At step 2103, optimization processing of the nonlinear conversion LUT is performed. The optimization processing of the nonlinear conversion LUT is the same as the processing at steps 1202 to 1210 in the color separation LUT creation processing explained in FIG. 12 of the first embodiment.

At step 2104, whether the value of the number i of times of loop has reached the upper limit is determined. In the case where the upper limit has not been reached (in the case where the value of the variable i is less than N), the variable i is incremented (i=i+1) and the processing returns to step 2102 and the processing is continued. On the other hand, in the case where the value of the number i of times of loop has reached the upper limit (value of variable i=N), this processing is terminated.

In the manner as described above, the nonlinear conversion LUT having optimum grid point values (output RGB values) is created.

According to the present embodiment, by performing nonlinear conversion before color conversion processing, the grid point intervals of the multidimensional LUT used for the color conversion processing are unequalized. Even in the case such as this where the grid point intervals are unequal, it is possible to cause each component of multidimensional input image data to have change characteristics at each portion between adjacent grid points and to increase the accuracy of interpolation operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, in color separation processing by a method that combines a multidimensional LUT and interpolation processing, it is possible to reduce errors accompanying interpolation processing and to implement smooth gradation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-093162 filed May 6, 2016, which is hereby incorporated by reference wherein in its entirety.

What is claimed is:

1. An image processing apparatus comprising:
a one or more processors;
a memory coupled with the one or more processors and including instructions stored thereon that, when executed by the one or more processors, cause the image processing apparatus to:
obtain an input value of an input image;
select information indicating a change characteristics expression corresponding to the input value out of a plurality of pieces of information, each indicating change characteristics expressions corresponding to the input value; and
perform, by interpolation processing using a lookup table having a plurality of dimensions in accordance with signal components of the input image based on the selected information indicating the change characteristics expression, color separation of the input value that is each pixel value of the input image into an output value corresponding to each of signal components handled by an output device, wherein
each piece of information represents a change characteristics expression at each portion between adjacent grid points for each dimension of the plurality of dimensions, and
at least a part of grid points of the lookup table are associated with any one of the pieces of information.

2. The image processing apparatus according to claim 1, wherein
the output value is determined by tetrahedral interpolation using a weight coefficient derived based on the information representing the change characteristics expression.

3. The image processing apparatus according to claim 1, wherein
the signal components of the input image are R, G, and B, and
in the lookup table, information representing the change characteristics expression at each portion between adjacent grid points is associated with each grid point for each dimension of an R-axis, a G-axis, and a B-axis.

4. The image processing apparatus according to claim 1, wherein
the signal components of the input image are C, M, Y, and K, and
in the lookup table, information representing the change characteristics expression at each portion between adjacent grid points is associated with each grid point for each dimension of a C-axis, an M-axis, a Y-axis, and a K-axis.

5. The image processing apparatus according to claim 1, wherein
the information representing the change characteristics expression is a mathematical expression representing nonlinearity of an output value between adjacent grid points.

6. The image processing apparatus according to claim 1, wherein
the information representing the change characteristics expression is a table that shows nonlinearity of an output value between adjacent grid points and in which a predetermined number of input values and a predetermined number of output values are associated with each other.

7. The image processing apparatus according to claim 1, wherein
the information representing the change characteristics expression is associated with each grid point of the lookup table by an index value to identify change characteristics with different contents.

8. The image processing apparatus according to claim 7, wherein
the index value is associated with each grid point of the lookup table and stored in the lookup table.

9. The image processing apparatus according to claim 1, wherein
the signal components of the input image include a gloss component representing gloss of an image in addition to a color component representing a color of an image.

10. The image processing apparatus according to claim 1, wherein
the output device is a printer, and
the output value corresponding to each of signal components handled by the output device is a color material value representing an amount of color material used for a printout in the printer.

11. The image processing apparatus according to claim 10, wherein
the printer is an ink jet printer,
the color material value is an ink value, and
in accordance with a kind of ink, an index value is associated with only part of grid points in the lookup table.

12. The image processing apparatus according to claim 11, wherein
the lookup table is provided for each of the kinds of ink.

13. The image processing apparatus according to claim 1, wherein
before the color separation is performed, nonlinear conversion is performed by using a one-dimensional lookup table in which each pixel value of the input image is taken to be an input value.

14. A color separation processing method comprising:
obtaining an input value of an input image;
selecting information indicating a change characteristics expression corresponding to the input value out of a plurality of pieces of information each indicating change characteristics expressions corresponding to the input value; and
performing, by interpolation processing using a lookup table having a plurality of dimensions in accordance with signal components of the input image based on the selected information indicating the change characteristics expression, color separation of the input value that is each pixel value of the input image into an output value corresponding to each of signal components handled by an output device, wherein
each piece of information represents a change characteristics expression at each portion between adjacent grid points for each dimension of the plurality of dimensions, and
at least a part of grid points of the lookup table are associated with any one of the pieces of information.

* * * * *